United States Patent
Endo et al.

(10) Patent No.: US 12,147,233 B2
(45) Date of Patent: Nov. 19, 2024

(54) INFORMATION PROCESSING DEVICE AND INFORMATION PROCESSING METHOD

(71) Applicant: SONY GROUP CORPORATION, Tokyo (JP)

(72) Inventors: Yuki Endo, Tokyo (JP); Keisuke Maeda, Tokyo (JP)

(73) Assignee: SONY GROUP CORPORATION, Tokyo (JP)

( * ) Notice: Subject to any disclaimer, the term of this patent is extended or adjusted under 35 U.S.C. 154(b) by 262 days.

(21) Appl. No.: 17/773,735

(22) PCT Filed: Sep. 4, 2020

(86) PCT No.: PCT/JP2020/033589
§ 371 (c)(1),
(2) Date: May 2, 2022

(87) PCT Pub. No.: WO2021/090566
PCT Pub. Date: May 14, 2021

(65) Prior Publication Data
US 2022/0413503 A1    Dec. 29, 2022

(30) Foreign Application Priority Data
Nov. 8, 2019   (JP) .................. 2019-203226

(51) Int. Cl.
*G05D 1/00*    (2024.01)
(52) U.S. Cl.
CPC ................. *G05D 1/0214* (2013.01)

(58) Field of Classification Search
CPC ............ G05D 1/00; G08G 1/00; G01C 21/34
See application file for complete search history.

(56) References Cited

U.S. PATENT DOCUMENTS

| | | | |
|---|---|---|---|
| 9,248,834 B1* | 2/2016 | Ferguson | B60W 50/0097 |
| 2002/0069010 A1 | 6/2002 | Nishira et al. | |
| 2012/0053808 A1* | 3/2012 | Arai | B60W 10/06 701/96 |
| 2017/0031361 A1* | 2/2017 | Olson | B60W 40/10 |
| 2020/0082248 A1* | 3/2020 | Villegas | G06N 3/044 |
| 2020/0341466 A1* | 10/2020 | Pham | B60W 30/18159 |
| 2021/0262808 A1* | 8/2021 | Wang | G08G 1/166 |

FOREIGN PATENT DOCUMENTS

| | | |
|---|---|---|
| CN | 102405166 A | 4/2012 |
| EP | 2412595 A1 | 2/2012 |
| JP | 2002-137652 A | 5/2002 |
| JP | 2002-316552 A | 10/2002 |

(Continued)

OTHER PUBLICATIONS

International Search Report and Written Opinion of PCT Application No. PCT/JP2020/033589, issued on Nov. 17, 2020, 10 pages of ISRWO.

*Primary Examiner* — Tan Q Nguyen
(74) *Attorney, Agent, or Firm* — CHIP LAW GROUP

(57) ABSTRACT

An information processing device according to an embodiment includes a reception unit that accepts designation of a tracking target, a setting unit that sets a virtual tracking target different from the tracking target, and a drive control unit that controls driving of a mobile body on the basis of the virtual tracking target.

15 Claims, 8 Drawing Sheets

(56) References Cited

FOREIGN PATENT DOCUMENTS

| | | |
|---|---|---|
| JP | 2010-264776 A | 11/2010 |
| JP | 2018-106312 A | 7/2018 |
| JP | 2018-154218 A | 10/2018 |
| MX | 2011010331 A | 10/2011 |
| WO | 2010/131542 A1 | 11/2010 |

* cited by examiner

INFORMATION PROCESSING DEVICE AND INFORMATION PROCESSING METHOD

CROSS REFERENCE TO RELATED APPLICATIONS

This application is a U.S. National Phase of International Patent Application No. PCT/JP2020/033589 filed on Sep. 4, 2020, which claims priority benefit of Japanese Patent Application No. JP 2019-203226 filed in the Japan Patent Office on Nov. 8, 2019. Each of the above-referenced applications is hereby incorporated herein by reference in its entirety.

FIELD

The present invention relates to an information processing device, an information processing method, and an information processing program.

BACKGROUND

In recent years, autonomous mobile robots equipped with artificial intelligence, such as robot vacuum cleaners and pet robots in houses and transport robots in factories and distribution warehouses, have been actively developed.

As an example, an autonomous mobile robot that travels while tracking a tracking target such as a moving person or animal has been developed. For example, there is known technology in which a robot stores a traveling route of a tracking target, and when the tracking target moves to a position shifted to the left or right from the front of the body of the robot, a traveling route on which the tracking target has traveled in the past is traced and tracked.

CITATION LIST

Patent Literature

Patent Literature 1: JP 2018-106312 A

SUMMARY

Technical Problem

However, in the above-described related art, there is a disadvantage that it is not possible to cause the autonomous mobile robot to track the tracking target in a behavior that appears natural to people's eyes since there is too much emphasis on tracking the tracking target. For example, in the related art, when the tracking target moves to a position shifted from the front of the body of the robot to the left or right, the robot does not immediately face the direction of the tracking target. Thus, it is difficult for the tracking target to recognize that it is being tracked, and there is a possibility that the tracking target may feel anxious.

The present application has been made in view of the above, and an object of the present application is to provide an information processing device, an information processing method, and an information processing program that enable an autonomous mobile robot to track the tracking target in a more natural behavior.

Solution to Problem

To solve the above problem, an information processing device comprising:
a reception unit that accepts designation of a tracking target;
a setting unit that sets a virtual tracking target different from the tracking target; and
a drive control unit that controls driving of a mobile body on a basis of the virtual tracking target.

DESCRIPTION OF EMBODIMENTS

Hereinafter, embodiments of the present disclosure will be described in detail on the basis of the drawings. Note that in each of the following embodiments, the same parts are denoted by the same symbol, and redundant description will be omitted.

The present disclosure will be described in the following order of items.
1. Embodiment
   1-1. Overview of Information Processing According to Embodiment
   1-2. Behavior of Autonomous Mobile Robot during Tracking Traveling According to Related Art
   1-3. Configuration of Information Processing System According to Embodiment
   1-4. Procedure of Information Processing According to Embodiment
2. Other Embodiments
   2-1. Application Example under Other Conditions
3. Application Example to Mobile Body
4. Effects of Present Disclosure
5. Hardware Configuration

1. Embodiment

1-1. Overview of Information Processing According to Embodiment

Figure 1:
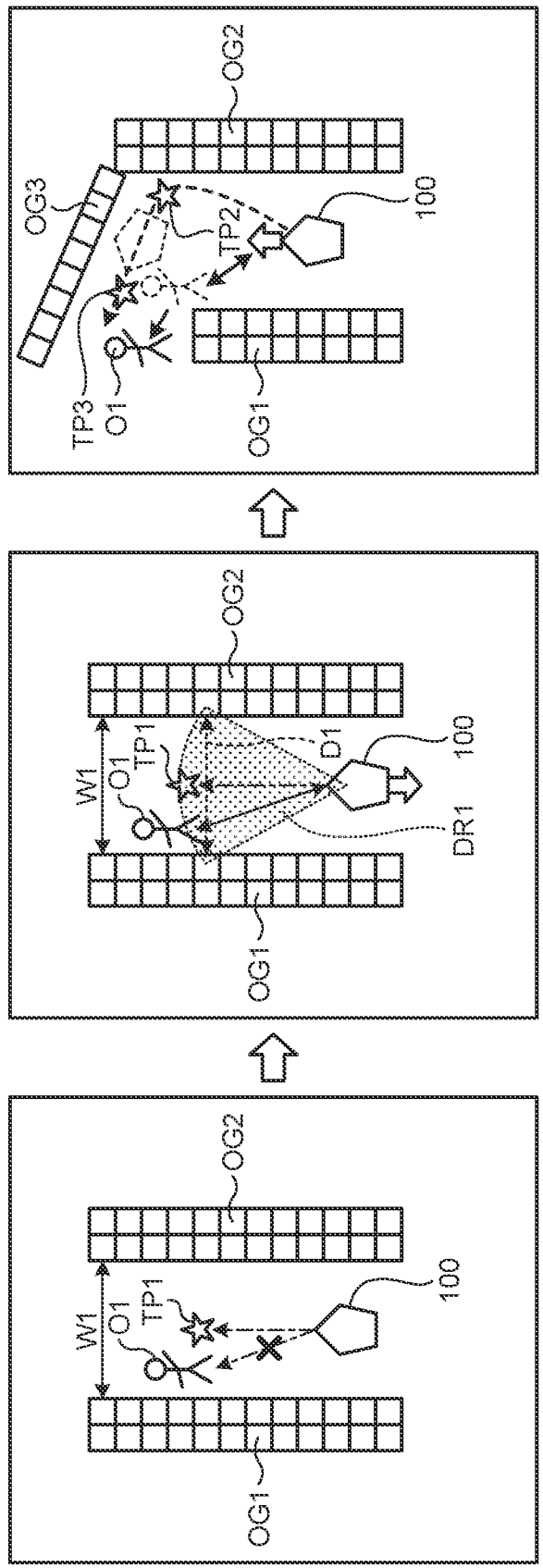
FIG. 1 is a diagram illustrating an example of information processing according to an embodiment of the present disclosure.

First, an overview of information processing according to an embodiment of the present disclosure will be described by referring to FIG. 1. FIG. 1 is a diagram illustrating an example of the information processing according to the embodiment of the present disclosure. Illustrated in FIG. 1 is a case where a mobile body device 100 (hereinafter, also referred to as a mobile body), which is an autonomous mobile robot, tracks a tracking target O1 on a two-dimensional occupied grid map (hereinafter also referred to as an occupied grid map).

Generally, in the related art in which an autonomous mobile robot stores and tracks a past traveling route of a tracking target, when the tracking target significantly moves to the left or right, the autonomous mobile robot significantly moves to the left or right with a delay after the tracking target. As described above, in the related art, since the autonomous mobile robot significantly moves to the left or right with a delay after the tracking target, there is a lot of time during which the tracking target is located outside a detection range of a detection sensor. As a result, the autonomous mobile robot cannot capture the tracking target and cannot continue to store the route of the tracking target, and thus the autonomous mobile robot often loses sight of the tracking target (also referred to as being lost). In addition, since the autonomous mobile robot does not face in the direction of the tracking target in real time, it is difficult for the tracking target to recognize that it is being tracked, and there is a possibility that the tracking target may feel anxious.

Furthermore, in general, a situation in which an autonomous mobile robot tracks a tracking target in a narrow passage or a narrow space can be regarded as a situation in which the operation of avoiding an obstacle by the autonomous mobile robot tends to conflict with the operation of tracking the tracking target. Therefore, in a situation where the autonomous mobile robot tracks the tracking target in a narrow passage or a narrow space, the traveling route of the autonomous mobile robot tends to meander, and the autonomous mobile robot often tracks the tracking target in a behavior that appears to be unnatural to people's eyes.

Therefore, the mobile body device 100 according to the embodiment of the present disclosure accepts designation of a tracking target. The mobile body device 100 also sets a virtual tracking target different from the tracking target. Furthermore, the mobile body device 100 controls driving of the mobile body on the basis of the virtual tracking target. In this manner, the mobile body device 100 sets a virtual tracking target different from a tracking target and controls driving of the mobile body device 100 so as to track the virtual tracking target. As a result, the mobile body device 100 travels straight toward the virtual tracking target without being affected by the traveling of the tracking target even when the tracking target significantly moves to the left or right, and thus it is possible to cause the autonomous mobile robot to track the tracking target in a more natural behavior. At this point, by setting the virtual tracking target at a position where the tracking target can be continuously captured in a detection range of a detection sensor, it becomes possible to reduce the risk that the tracking target is located outside the detection range of the detection sensor.

In addition, even in a situation in which the operation of avoiding an obstacle by the autonomous mobile robot tends to conflict with the operation of tracking the tracking target, such as a situation where the autonomous mobile robot tracks the tracking target on a narrow passage, the mobile body device 100 can allow the autonomous mobile robot to focus on the operation of tracking the virtual tracking target. Therefore, the autonomous mobile robot can be prevented from meandering due to the conflict between the avoiding operation and the tracking operation. Therefore, the mobile body device 100 can cause the autonomous mobile robot to track the tracking target in a more natural behavior.

Let us return to the description of FIG. 1. In the example illustrated on the left in FIG. 1, the mobile body device 100 (also referred to as a mobile body) accepts designation of a tracking target (tracking target O1) identified by identification information "O1" from a user of the mobile body device 100. Upon accepting the designation of the tracking target, the mobile body device 100 sets the tracking target O1. Subsequently, after the tracking target O1 has been set, the mobile body device 100 sets a normal tracking mode which is a tracking mode in which the mobile body device 100 travels while following the tracking target O1 that has been designated. Here, the action policy such as the normal tracking mode is stored in a storage unit 130 (see FIG. 4). The mobile body device 100 refers to the storage unit 130 to sets (selects) the normal tracking mode.

Subsequently, after the normal tracking mode has been set, the mobile body device 100 travels while tracking the tracking target O1. Specifically, the mobile body device 100 plans a traveling route for traveling while tracking the tracking target O1 in accordance with the action policy of the normal tracking mode. Subsequently, the mobile body device 100 starts tracking the tracking target O1 by controlling the driving of the mobile body device 100 so as to travel in accordance with the route plan.

During the tracking control of the tracking target O1, the mobile body device 100 estimates passages around the mobile body. In the example illustrated on the left in FIG. 1, on the basis of the arrangement of an occupied grid matrix OG1 and an occupied grid matrix OG2 in an occupied grid map, the mobile body device 100 estimates that there is a straight passage sandwiched by the occupied grid matrix OG1 and the occupied grid matrix OG2 around the mobile body.

Subsequently, in a case where it is estimated that there is a passage, the mobile body device 100 estimates the width of the passage around the mobile body. In the example illustrated on the left in FIG. 1, the mobile body device 100 calculates a distance W1 from a predetermined occupied grid included in the occupied grid matrix OG1 to an occupied grid present in a direction perpendicular to the extending direction of the passage with respect to the predetermined occupied grid on the basis of the occupied grid map. Subsequently, the mobile body device 100 estimates the distance W1 that has been calculated as a width W1 of the passage around the mobile body.

Subsequently, after estimating the width W1 of the passage, the mobile body device 100 determines whether or not the width of the passage is less than or equal to a predetermined threshold value TH1. Specifically, the mobile body device 100 compares the width W1 of the passage that has been estimated with the predetermined threshold value TH1 and determines whether or not the width W1 of the passage that has been estimated is less than or equal to the predetermined threshold value TH1. In the example illustrated on the left in FIG. 1, the mobile body device 100 determines that the width W1 of the passage that has been estimated is less than or equal to the predetermined threshold value TH1. Here, the predetermined threshold value TH1 corresponds to, for example, a length obtained by adding a predetermined margin to the lateral width of the mobile body device 100.

Subsequently, in a case where it is determined that the width W1 of the passage is less than or equal to the predetermined threshold value TH1, the mobile body device 100 switches the action policy from the normal tracking mode to a narrow passage straight tracking mode which is a tracking mode for a narrow passage straight route in which a virtual tracking target different from the tracking target is tracked. In the narrow passage straight tracking mode, the mobile body device 100 sets a virtual tracking target different from the tracking target and controls driving of the mobile body device 100 so as to track the virtual tracking target. Specifically, after switching the action policy to the narrow passage straight tracking mode, the mobile body device 100 sets a virtual tracking target TP1 on the center line of the passage.

In this manner, even in a situation in which the operation of avoiding an obstacle by the autonomous mobile robot tends to conflict with the operation of tracking the tracking target, such as a situation where the autonomous mobile robot tracks the tracking target on a narrow passage, the mobile body device 100 can allow the autonomous mobile robot to focus on the operation of tracking the virtual tracking target TP1. As described above, since the mobile body device 100 can allow the autonomous mobile robot to focus on the operation of tracking the virtual tracking target TP1, it is possible to prevent the autonomous mobile robot from performing the avoiding operation. In addition, since the mobile body device 100 can prevent the autonomous mobile robot from performing the avoiding operation, it is possible to prevent the autonomous mobile robot from meandering due to the conflict between the avoiding operation and the tracking operation.

In the example illustrated in the center of FIG. 1, when the virtual tracking target TP1 is set, the mobile body device 100 resets the distance to the tracking target O1 (also referred to as a tracking distance). Specifically, the mobile body device 100 includes a sensor for detecting the tracking target O1. Then, the mobile body device 100 controls the distance between the tracking target O1 and the mobile body so that the tracking target O1 is captured within the detection range of the sensor. More specifically, the mobile body device 100 controls the distance between the tracking target O1 and the mobile body device 100 so that the tracking target O1 is captured within a detection range DR1 of the sensor on the basis of a spread angle D1 of the detection range DR1 of the sensor and the width W1 of the passage around the mobile body. For example, the mobile body device 100 controls the distance between the tracking target O1 and the mobile body device 100 so that the spread angle D1 of the detection range DR1 of the sensor coincides with the width W1 of the passage around the mobile body.

Here, if the mobile body device 100 is too close to the tracking target O1, there is a possibility that the tracking target O1 may enter blind spots of the sensors on both sides of the mobile body device 100 and that the tracking target O1 may deviate from the detection range of the sensors. Therefore, the mobile body device 100 controls the distance between the tracking target O1 and the mobile body device 100 so that the spread angle D1 of the detection range DR1 of the sensor coincides with the width W1 of the passage around the mobile body. As a result, the mobile body device 100 can continuously capture the tracking target O1 within the detection range DR1 of the sensor (for example, the viewing angle of a camera). That is, the mobile body device 100 can prevent the tracking target O1 from deviating from the detection range of the sensor.

Subsequently, when the tracking distance is reset, the mobile body device 100 determines whether or not a corner has been detected. When no corner has been detected, the mobile body device 100 maintains the narrow passage straight tracking mode or switches the action policy from the narrow passage straight tracking mode to the normal tracking mode. Subsequently, the mobile body device 100 plans a traveling route in accordance with the narrow passage straight tracking mode or the normal tracking mode and controls tracking on the route.

In the example illustrated on the right in FIG. 1, the mobile body device 100 detects a corner of a left turn since an occupied grid matrix OG3, which is a corner with respect to the extending direction of the straight passage (straight passage sandwiched by the occupied grid matrix OG1 and the occupied grid matrix OG2) before the corner of the passage, is arranged while inclined counterclockwise. Since the mobile body device 100 has detected the corner, the action policy is switched from the narrow passage straight tracking mode (or the normal tracking mode) to a corner tracking mode which is a tracking mode for corner routes.

Subsequently, when the action policy is switched to the corner tracking mode, the mobile body device 100 resets a tracking distance for corners. Specifically, the mobile body device 100 controls driving of the mobile body device 100 so as to reduce the distance between the tracking target O1 and the mobile body device 100 as compared with that before the corner of the passage had been detected.

Here, in general, in a situation where the autonomous mobile robot tracks a tracking target at a corner, the traveling direction of the tracking target suddenly changes, and thus the autonomous mobile robot that is tracking tends to lose sight of the tracking target. Therefore, in a case where a corner of the passage is detected, the mobile body device 100 according to the embodiment of the present disclosure reduces the distance to the tracking target as much as possible so as not to lose sight of the tracking target O1. On the other hand, there is a possibility that the tracking target may feel a sense of anxiety or a sense of fear when the autonomous mobile robot suddenly reduces the distance.

Therefore, the mobile body device 100 according to the embodiment of the present disclosure reduces the distance to the tracking target while maintaining a distance that does not make the tracking target O1 feel a sense of fear. As a result, the mobile body device 100 can track the tracking target O1 without losing sight of the tracking target O1 nor giving a sense of anxiety or fear to the tracking target O1 even under a tracking situation at a corner where the tracking target O1 is easily lost.

Subsequently, when the tracking distance for corners is reset, the mobile body device 100 sets a virtual tracking target TP2 for corners. Specifically, since the detected corner of the passage is a left turn, the mobile body device 100 sets the virtual tracking target TP2 on the right side with respect to the straight line passing through the center of the straight passage before the corner of the passage. Note that in a case where the detected corner of the passage is a right turn, the mobile body device 100 sets the virtual tracking target on the left side with respect to the straight line passing through the center of the straight passage before the corner of the passage. More specifically, the mobile body device 100 sets the virtual tracking target TP2 at a position separated inward by a predetermined distance from the end of the passage on the outer side of the corner of the passage. For example, in a case where a detected corner of the passage is a left turn (right turn), the mobile body device 100 sets a virtual tracking target at a position that is in an area on the right side (left side) with respect to the center line of the passage and is obtained by subtracting a predetermined distance (for example, a distance obtained by adding a margin to the lateral width of the mobile body) from the position of a wall of the outer occupied grid by back calculation. Subsequently, when the virtual tracking target TP2 for corners is set, the mobile body device 100 plans a traveling route in accordance with the corner tracking mode and controls the tracking on the route.

In addition, in general, in a situation where the autonomous mobile robot tracks a tracking target at a corner, the tracking target is more likely to be kept within the detection range of the sensor when the autonomous mobile robot that is tracking is located on the outer side of the corner than on the inner side of the corner. In this regard, as illustrated on the right in FIG. 1, a case where the corner of the passage is a left turn will be described in detail as an example. In the example illustrated on the right in FIG. 1, the left side (occupied grid matrix OG1 side) with respect to the straight line passing through the center of the straight passage before the corner of the passage is defined as the inner side of the corner, and the right side (occupied grid matrix OG2 side) with respect to the straight line passing through the center of the straight passage before the corner of the passage is defined as the outer side of the corner. As illustrated on the right in FIG. 1, when the tracking target O1 is viewed from a position on the inner side of the corner (position close to the occupied grid matrix OG1), the occupied grid matrix OG1 on the inner side of the corner is an obstacle, thereby increasing the risk of losing the tracking target O1. On the other hand, when the tracking target O1 is viewed from the outer side of the corner (position close to the occupied grid matrix OG2, for example, the position of the virtual tracking target TP2), the risk of losing sight of the tracking target O1 due to the occupied grid matrix OG1 on the inner side of the corner is low, and thus the tracking target O1 can be easily captured in the detection range of the sensor.

Therefore, in a case where a corner of the passage is a left turn, the mobile body device 100 according to the embodiment of the present disclosure sets the virtual tracking target TP2 on the right side (outer side of the corner) with respect to the straight line passing through the center of the straight passage before the corner of the passage. As a result, the mobile body device 100 can reduce the risk of losing the tracking target O1 by the occupied grid on the inner side of the corner.

Subsequently, when the mobile body arrives at the virtual tracking target TP2, the mobile body device 100 sets a new virtual tracking target TP3 ahead of the virtual tracking target TP2 by a predetermined distance (for example, 3 m). For example, when the mobile body arrives at the virtual tracking target TP2, the mobile body device 100 sets the new virtual tracking target TP3 with reference to an end of the passage on the outer side of the corner of the passage. Subsequently, after setting the new virtual tracking target TP3, the mobile body device 100 plans a traveling route in accordance with the corner tracking mode and controls the tracking on the route. Note that, when arriving at the new virtual tracking target TP3, the mobile body device 100 may switch the action policy from the corner tracking mode to the narrow passage straight tracking mode or the normal tracking mode.

As described above, the mobile body device 100 accepts designation of the tracking target. The mobile body device 100 also sets a virtual tracking target different from the tracking target. Furthermore, the mobile body device 100 controls driving of the mobile body on the basis of the virtual tracking target. In this manner, the mobile body device 100 sets a virtual tracking target different from a tracking target and controls driving of the mobile body device 100 so as to track the virtual tracking target. As a result, the mobile body device 100 travels straight toward the virtual tracking target without being affected by the traveling of the tracking target even when the tracking target significantly moves to the left or right, and thus it is possible to reduce the risk that the tracking target is located outside the detection range of the detection sensor. Therefore, the mobile body device 100 can cause the autonomous mobile robot to track the tracking target in a more natural behavior while keeping the tracking target within the detection range of the detection sensor.

In addition, even in a situation in which the operation of avoiding an obstacle by the autonomous mobile robot tends to conflict with the operation of tracking the tracking target, such as a situation where the autonomous mobile robot tracks the tracking target on a narrow passage, the mobile body device 100 can allow the autonomous mobile robot to focus on the operation of tracking the virtual tracking target. Therefore, the autonomous mobile robot can be prevented from meandering due to the conflict between the avoiding operation and the tracking operation. Therefore, the mobile body device 100 can cause the autonomous mobile robot to track the tracking target in a more natural behavior.

In addition, the mobile body device 100 can improve the value, performance, and safety at the time of the tracking operation by the autonomous mobile robot while using existing target tracking policies (or algorithms), route planning algorithms, and the structure of the occupied grid map without modification. Specifically, the mobile body device 100 can use the existing asset called route search algorithms, which have been actively developed in recent years, at their maximum. In addition, since the mobile body device 100 does not require modification of route search algorithms that affect the load of a calculator, there is less influence on the calculation resources. In addition, the mobile body device 100 does not need to add sensors, calculation resources, hardware, or the like to an existing autonomous mobile robot and can travel by itself. In addition, the mobile body device 100 makes it possible to easily select an action plan policy at the time of tracking in accordance with the usability of a user or a use case in the framework of the present invention, such as applying only the tracking policy for corners.

1-2. Behavior of Autonomous Mobile Robot During Tracking Traveling According to Related Art An autonomous mobile robot during tracking traveling according to the related art implements safe behavior of the robot on a narrow passage (narrow space) or a corner by an approach of storing and tracking a route on which a tracking target has passed in the past when the tracking target deviates from the front of the robot to the left or right. Therefore, the autonomous mobile robot during the tracking traveling according to the related art often does not track the tracking target in a behavior that appears to be natural to people's eyes (in other words, tracks the tracking target in a behavior that appears to be unnatural to people's eyes). This point will be specifically described with reference to FIGS. 2 and 3.

Figure 2:
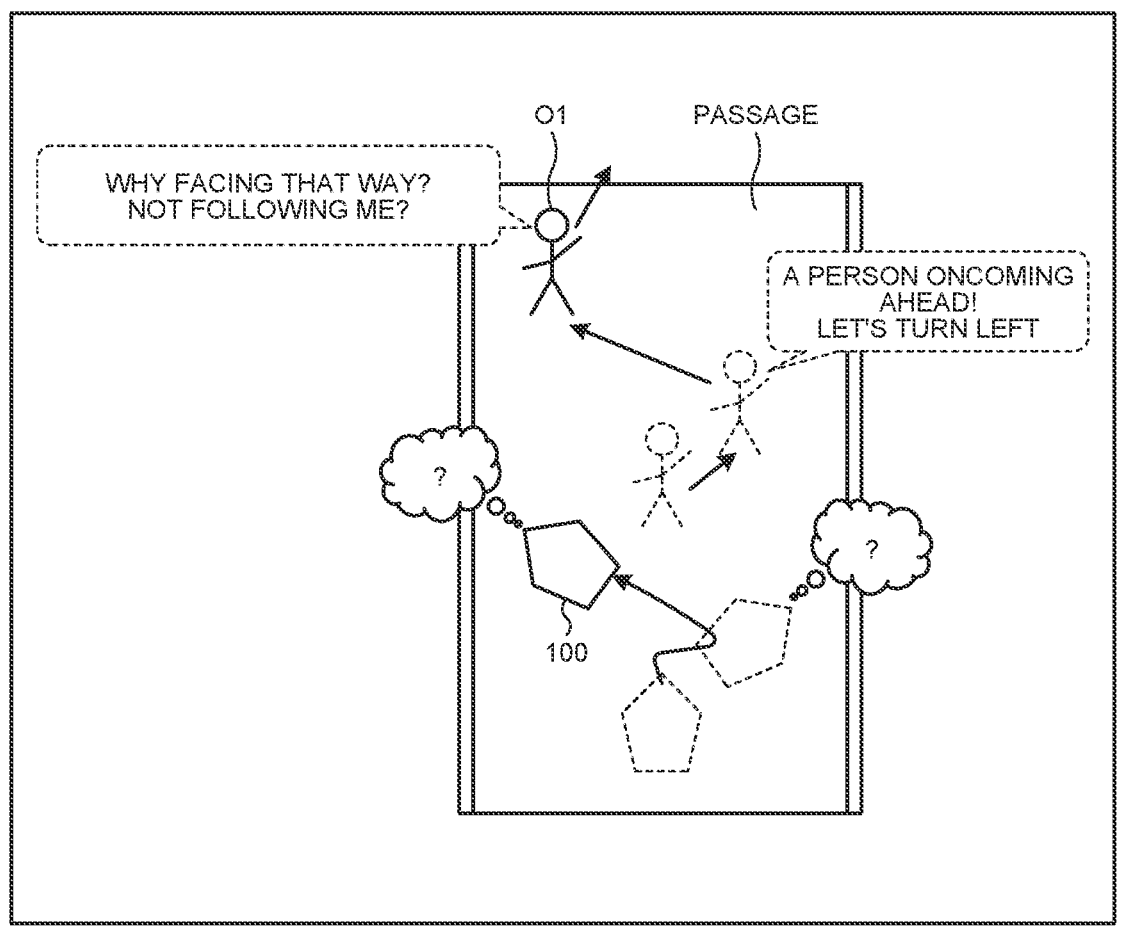
FIG. 2 is a diagram illustrating an example of behavior of an autonomous mobile robot during tracking traveling according to the related art.

First, the behavior of an autonomous mobile robot during tracking traveling according to the related art will be described with reference to FIG. 2. FIG. 2 is a diagram illustrating an example of the behavior of the autonomous mobile robot during tracking traveling according to the related art. In the example illustrated in FIG. 2, let us assume that the tracking target O1 moves from the center of the passage to the right end of the passage while traveling forward but then significantly moves from the right end of the passage to the left end of the passage while moving forward in order to avoid collision with an oncoming person. In this case, the autonomous mobile robot tracking the tracking target O1 tracks the route in which the tracking target O1 has moved forward so as to come closer to the right end of the passage from the center of the passage that the tracking target O1 has passed in the past. However, there is a possibility that the tracking target O1 is not present at a point after the tracking and that the sight of the tracking target O1 is lost.

Subsequently, the autonomous mobile robot tracks the route in which the tracking target O1 has significantly moved from the right end of the passage to the left end of the passage while moving forward, however, there is a possibility that the tracking target O1 is not present at a point after the subsequent tracking and that the sight of the tracking target O1 is lost. In addition, when the autonomous mobile robot is viewed from the tracking target O1, the autonomous mobile robot is not facing toward the tracking target O1, and thus it is difficult for the tracking target O1 to recognize that it is being tracked, and there is a possibility that the tracking target O1 may feel anxious that the autonomous mobile robot cannot track the tracking target O1.

As described above, in a case where the related art, in which an autonomous mobile robot stores and tracks the past traveling route of a tracking target, is used, the tracking target is often located outside the detection range of the detection sensor. As a result, the autonomous mobile robot cannot capture the tracking target nor can continue to store the route of the tracking target, and thus the sight of the tracking target is often lost. In addition, since the autonomous mobile robot does not face in the direction of the tracking target in real time, it is difficult for the tracking target to recognize that it is being tracked, and there is a possibility that the tracking target may feel anxious.

Figure 3:
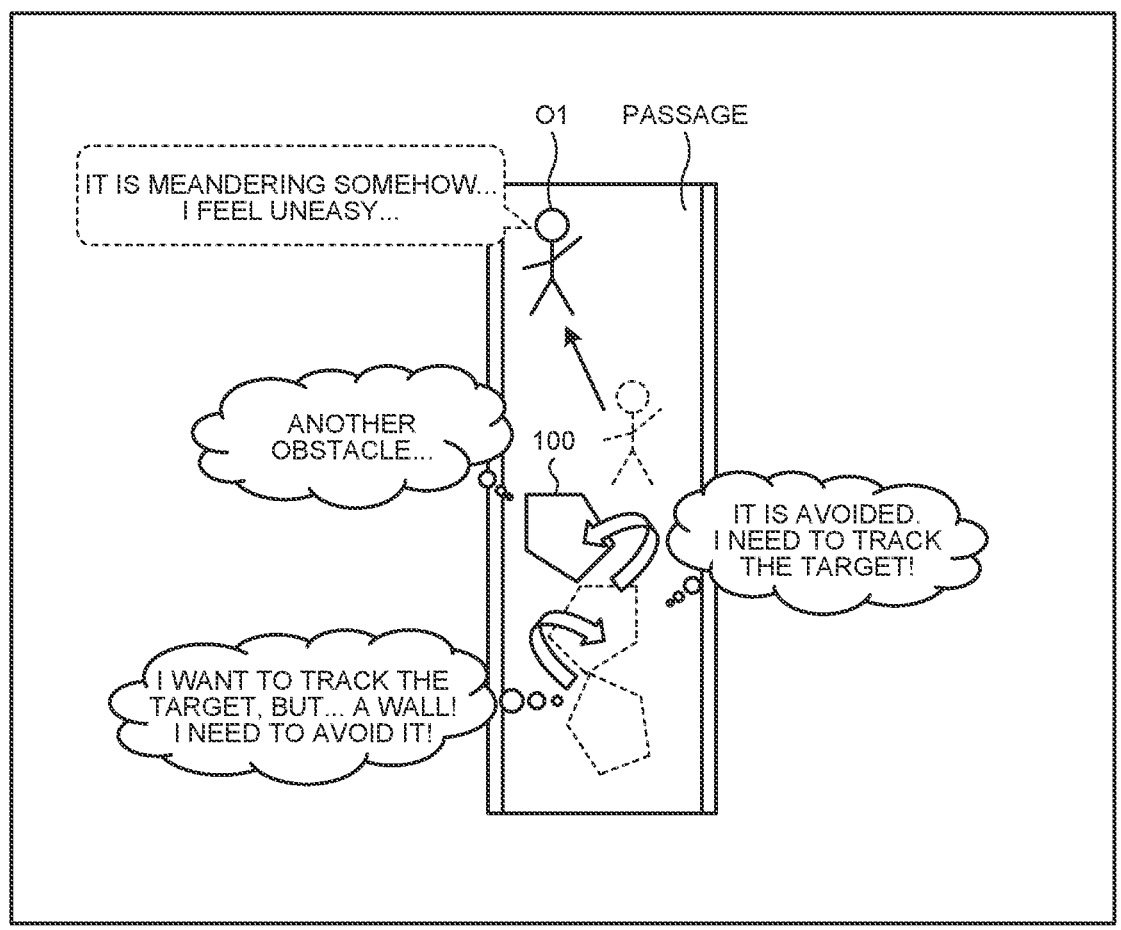
FIG. 3 is a diagram illustrating an example of behavior of an autonomous mobile robot during tracking traveling according to the related art.

Next, the behavior of an autonomous mobile robot during tracking traveling according to the related art will be described with reference to FIG. 3. FIG. 3 is a diagram illustrating an example of the behavior of the autonomous mobile robot during tracking traveling according to the related art. In the example illustrated in FIG. 3, a situation in which a mobile body device 100 according to the related art tracks the tracking target O1 in a narrow passage is illustrated. Generally, a passage being narrow for an autonomous mobile robot means that the probability of encountering a wall of the passage is high. That is, an environment in which the passage is narrow for the autonomous mobile robot means that there are many obstacles to be avoided.

In the example illustrated in FIG. 3, when the mobile body device 100 according to the related art tries to track the tracking target O1, a wall of the passage is detected immediately ahead since it is a narrow passage. When the mobile body device 100 detects the wall of the passage, in order to avoid collision with the wall of the passage which is an obstacle, an avoidance operation of avoiding the wall of the passage is prioritized over the tracking operation of tracking the tracking target O1. When collision with the wall of the passage has been avoided by the avoidance operation, the mobile body device 100 returns to the tracking operation of tracking the tracking target O1. However, since it is a narrow passage, the mobile body device 100 may detect again the wall of the passage immediately ahead and have to prioritize the avoidance operation of avoiding the wall of the passage again. Meanwhile, the autonomous mobile robot is seen from the tracking target O1, since the autonomous mobile robot meanders, the tracking target O1 may feel that the behavior of the autonomous mobile robot is unnatural and feel anxious.

As described above, since the situation in which an autonomous mobile robot tracks a tracking target in a narrow passage is a situation in which the operation of avoiding an obstacle by the autonomous mobile robot tends to conflict with the operation of tracking the tracking target, the traveling route of the autonomous mobile robot tends to meander, and the autonomous mobile robot often tracks the tracking target in a behavior that appears to be unnatural to people's eyes.

1-3. Configuration of Information Processing System According to Embodiment

Figure 4:
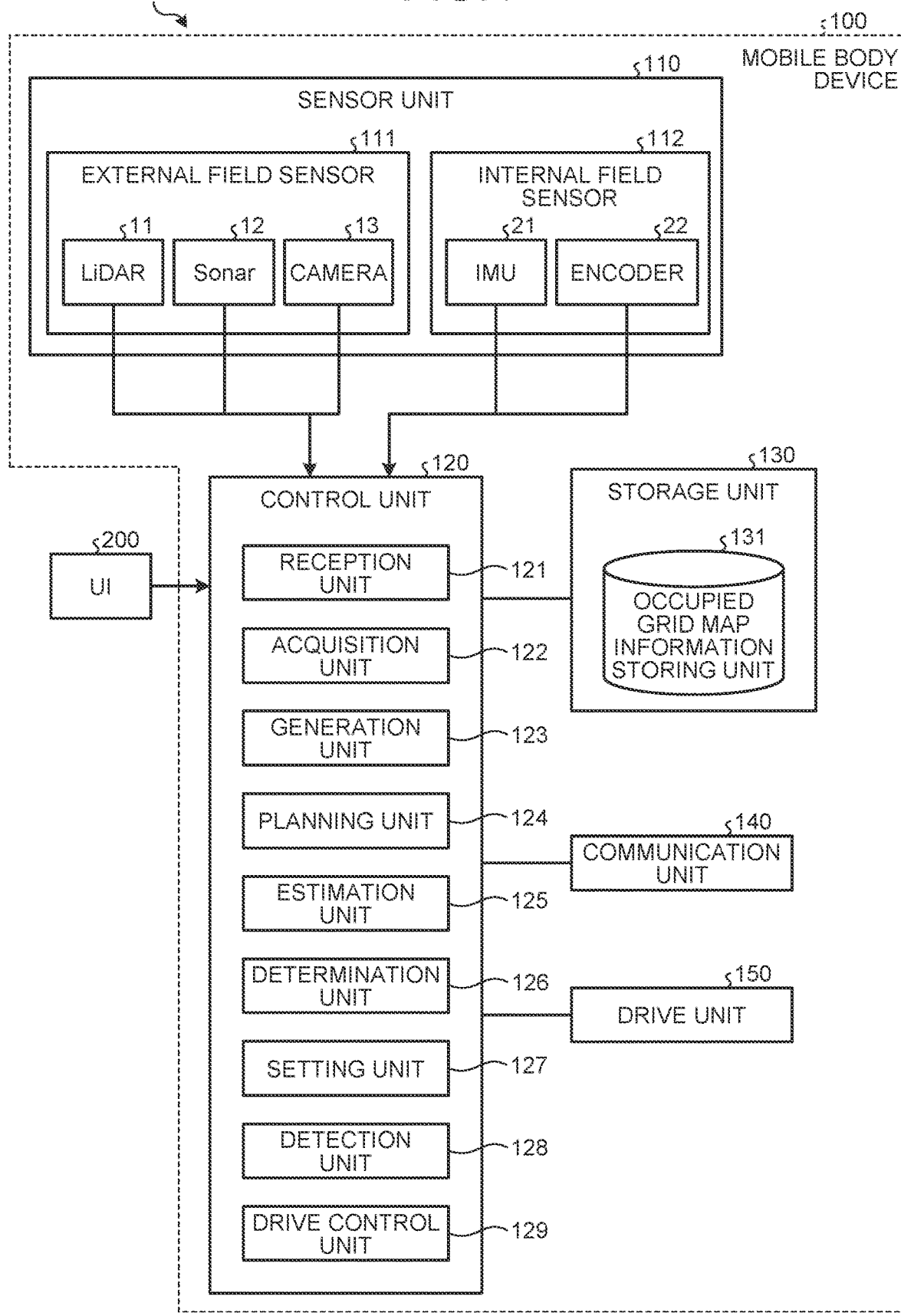
FIG. 4 is a diagram illustrating a configuration example of an information processing system according to the embodiment of the present disclosure.

Next, the configuration of the information processing system according to the embodiment of the present disclosure will be described with reference to FIG. 4. FIG. 4 is a diagram illustrating a configuration example of the information processing system according to the embodiment of the present disclosure. As illustrated in FIG. 4, an information processing system 1 according to the embodiment of the present disclosure includes the mobile body device 100 and a user interface 200. Note that the information processing system 1 may include an external information processing device. These various devices are communicably connected in a wired or wireless manner via a network N (for example, the Internet). Note that the information processing system 1 illustrated in FIG. 4 may include any number of mobile body devices 100 and any number of user interfaces 200.

The mobile body device 100 is an information processing device that performs the information processing illustrated in FIG. 1. The mobile body device 100 accepts designation of a tracking target from a user of the mobile body device 100 via the user interface 200.

The user interface 200 accepts input of the designation of the tracking target from the user of the mobile body device 100. Upon accepting the input of the designation of the tracking target, the user interface 200 outputs target information related to the tracking target that has been received to the mobile body device 100.

Next, the configuration of the mobile body device 100 according to the embodiment of the present disclosure will be described with reference to FIG. 4. As illustrated in FIG. 4, the mobile body device 100 according to the embodiment of the present disclosure includes a sensor unit 110, a control unit 120, the storage unit 130, a communication unit 140, and a drive unit 150.

Sensor Unit 110

The sensor unit 110 can include various sensor devices. For example, the sensor unit 110 can include an external field sensor 111 and an internal field sensor 112. The sensor unit 110 performs sensing using sensors. The sensor unit 110 also outputs sensing information acquired by the various sensors by sensing to the control unit 120.

The sensor unit 110 acquires, by using the external field sensor 111 and the internal field sensor 112, information used by the control unit 120 for estimating the position of the mobile body device 100. The external field sensor 111 is a device that senses information outside the mobile body device 100. For example, the external field sensor 111 includes a laser imaging detection and ranging (LiDAR) 11, a sonar 12, and a camera 13. The internal field sensor is a device that senses information inside the mobile body device 100. For example, the internal field sensor 112 includes an IMU 21 and an encoder 22.

The sensor unit 110 also outputs sensing information acquired by the external field sensor 111 by sensing to a generation unit 123. The sensor unit 110 further outputs sensing information acquired by the internal field sensor 112 by sensing to the generation unit 123.

Control Unit 120

The control unit 120 is implemented by, for example, a central processing unit (CPU), a micro processing unit (MPU), or the like executing various programs (corresponds to an example of an information processing program) stored in a storage device inside the mobile body device 100 using a RAM as a work area. Furthermore, the control unit 120 is implemented by, for example, an integrated circuit such as an application specific integrated circuit (ASIC) or a field programmable gate array (FPGA).

As illustrated in FIG. 4, the control unit 120 includes a reception unit 121, an acquisition unit 122, the generation unit 123, a planning unit 124, an estimation unit 125, a determination unit 126, a setting unit 127, a detection unit 128, and a drive control unit 129 and implements or executes the functions or actions of information processing described below. Note that the internal configuration of the control unit 120 is not limited to the configuration illustrated in FIG. 4 and may be another configuration as long as the information processing described below is performed.

Reception Unit 121

The reception unit 121 accepts designation of a tracking target. Specifically, the reception unit 121 accepts designation of a tracking target from a user of the mobile body device 100 via the user interface 200. More specifically, the reception unit 121 accepts designation of the tracking target identified by identification information from the user of the mobile body device 100. In the example illustrated on the left in FIG. 1, the reception unit 121 accepts designation of a tracking target (tracking target O1) identified by identification information "O1" from the user of the reception unit 121.

Acquisition Unit 122

The acquisition unit 122 acquires various types of information. Specifically, the acquisition unit 122 acquires sensing information from the sensor unit 110. For example, the acquisition unit 122 acquires sensing information by the external field sensor 111 from the sensor unit 110. The acquisition unit 122 also acquires sensing information by the internal field sensor 112 from the sensor unit 110.

In addition, the acquisition unit 122 acquires map information regarding an occupied grid map generated by the generation unit 123. After acquiring the map information, the acquisition unit 122 stores the map information that has been acquired in an occupied grid map information storing unit 131.

In addition, the acquisition unit 122 acquires information regarding its own position, the traveling speed, the traveling direction, and the attitude of the host device calculated by the generation unit 123.

Generation Unit 123

The generation unit 123 generates an occupied grid map. Specifically, the generation unit 123 acquires the sensing information by the external field sensor 111 from the sensor unit 110. Subsequently, the generation unit 123 generates the occupied grid map on the basis of the sensing information from the external field sensor 111. After generating the occupied grid map, the generation unit 123 stores map information related to the occupied grid map that has been generated in the occupied grid map information storing unit 131.

In addition, the generation unit 123 updates the occupied grid map on the basis of the sensing information by the external field sensor 111. The generation unit 123 stores the map information related to the occupied grid map that has been updated in the occupied grid map information storing unit 131.

The generation unit 123 also calculates its own position. In addition, the generation unit 123 calculates the traveling speed, the traveling direction, and the attitude of the host device. Specifically, the generation unit 123 acquires the sensing information by the internal field sensor 112 from the sensor unit 110. Subsequently, the generation unit 123 calculates its own position, the traveling speed, the traveling direction, and the attitude of the host device on the basis of the sensing information by the internal field sensor 112.

Planning Unit 124

The planning unit 124 plans a traveling route on which the mobile body travels. Specifically, the planning unit 124 plans a traveling route on which the mobile body travels in accordance with the action policy set by the setting unit 127. For example, the planning unit 124 plans a traveling route on which the mobile body travels while tracking the tracking target in accordance with the action policy of the normal tracking mode set by the setting unit 127.

In the example illustrated on the left in FIG. 1, when the setting unit 127 sets the normal tracking mode, the planning unit 124 plans a traveling route on which the mobile body device 100 travels while tracking the tracking target O1 in accordance with the action policy of the normal tracking mode.

Estimation Unit 125

The estimation unit 125 estimates the width of the passage around the mobile body. Specifically, when the planning unit 124 plans the traveling route, the estimation unit 125 acquires sensing information by the external field sensor 111 from the sensor unit 110. Subsequently, the estimation unit 125 acquires arrangement information regarding the arrangement of occupied grids on the basis of the sensing information that has been acquired. Subsequently, the estimation unit 125 estimates the passage around the mobile body on the basis of the arrangement information regarding the arrangement of occupied grids. For example, the estimation unit 125 estimates the passage on the basis of the periodicity of the arrangement of occupied grids located on both sides around the mobile body.

In the example illustrated on the left in FIG. 1, the estimation unit 125 estimates that there is a straight passage sandwiched between the occupied grid matrix OG1 and the occupied grid matrix OG2 around the mobile body on the basis of the periodicity of the arrangement of occupied grids included in the occupied grid matrix OG1 located on the left side around the mobile body and the periodicity of the arrangement of occupied grids included in the occupied grid matrix OG2 located on the right side around the mobile body.

Subsequently, when estimating that there is a passage around the mobile body, the estimation unit 125 estimates the width of the passage around the mobile body. For example, based on the occupied grid map, the estimation unit 125 calculates the distance from a predetermined occupied grid included in an occupied grid matrix on one of the ends of the passage to an occupied grid present in a direction perpendicular to the extending direction of the passage with respect to the predetermined occupied grid. Subsequently, the estimation unit 125 estimates the distance that has been calculated as the width of the passage around the mobile body.

In the example illustrated on the left in FIG. 1, the estimation unit 125 calculates the distance W1 from a predetermined occupied grid included in the occupied grid matrix OG1 to an occupied grid present in a direction perpendicular to the extending direction of the passage with respect to the predetermined occupied grid on the basis of the occupied grid map. Subsequently, the estimation unit 125 estimates the distance W1, which has been calculated, as the width W1 of the passage around the mobile body.

Determination Unit 126

The determination unit 126 determines whether or not the width of the passage estimated by the estimation unit 125 is less than or equal to a predetermined threshold value. Specifically, the determination unit 126 compares the width of the passage estimated by the estimation unit 125 with the predetermined threshold value and determines whether or not the width of the passage estimated by the estimation unit 125 is less than or equal to the predetermined threshold value.

In the example illustrated on the left of FIG. 1, the determination unit 126 compares the width W1 of the passage estimated by the estimation unit 125 with the predetermined threshold value TH1 and determines whether or not the width W1 of the passage estimated by the estimation unit 125 is less than or equal to the predetermined threshold value TH1.

In addition, the determination unit 126 determines whether or not the detection unit 128 has detected a corner. In a case where the detection unit 128 detects a corner, the determination unit 126 determines that detection unit 128 has detected the corner. On the other hand, in a case where the detection unit 128 has detected no corners, the determination unit 126 determines that detection unit 128 has not detected a corner.

Setting Unit 127

The setting unit 127 sets an action policy for the mobile body to travel. For example, when the reception unit 121 accepts the designation of the tracking target, the setting unit 127 sets the tracking target. Subsequently, after setting the tracking target, the setting unit 127 sets the normal tracking mode, which is an action policy for traveling while tracking the tracking target that has been designated.

In the example illustrated on the left in FIG. 1, when the reception unit 121 accepts the designation of the tracking target, the setting unit 127 sets the tracking target O1. Subsequently, when setting the tracking target O1, the setting unit 127 sets the normal tracking mode, which is an action policy for traveling while tracking the tracking target O1 that has been designated.

In addition, in a case where the determination unit 126 determines that the width of the passage is less than or equal to the predetermined threshold value, the setting unit 127 switches the action policy from the normal tracking mode to the narrow passage straight tracking mode which is a tracking mode for narrow passage straight routes in which a virtual tracking target different from the tracking target is tracked. The setting unit 127 resets the action policy to the narrow passage straight tracking mode.

In the example illustrated on the left in FIG. 1, in a case where the determination unit 126 determines that the width W1 of the passage is less than or equal to the predetermined threshold value TH1, the setting unit 127 switches the action policy from the normal tracking mode to the narrow passage straight tracking mode.

The setting unit 127 sets a virtual tracking target different from the tracking target. Specifically, the setting unit 127 sets the virtual tracking target in a case where the width of the passage around the mobile body is less than or equal to the predetermined threshold value. Specifically, in a case where the determination unit 126 determines that the width of the passage is less than or equal to the predetermined threshold value, the setting unit 127 sets the virtual tracking target. More specifically, the setting unit 127 sets the virtual tracking target on the center line of the passage.

In the example illustrated on the left in FIG. 1, when the action policy is switched to the narrow passage straight tracking mode, the setting unit 127 sets the virtual tracking target TP1 on the center line of the passage. Specifically, when the setting unit 127 sets the action policy to the narrow passage straight tracking mode, the estimation unit 125 estimates the center line of the passage on the basis of an estimated position of the passage and the width W1 of the passage. Subsequently, the estimation unit 125 sets the virtual tracking target TP1 on the center line of the passage ahead, by a predetermined distance, of its own position calculated by the generation unit 123.

Meanwhile, in a case where the detection unit 128 has detected no corners, the setting unit 127 maintains the narrow passage straight tracking mode or switches the action policy from the narrow passage straight tracking mode to the normal tracking mode. On the other hand, in a case where the detection unit 128 has detected a corner, the setting unit 127 switches the action policy from the narrow passage straight tracking mode (or the normal tracking mode) to a corner tracking mode which is a tracking mode for corner routes. The setting unit 127 resets the action policy to the corner tracking mode.

In the example illustrated on the right in FIG. 1, since the detection unit 128 has detected a corner, the setting unit 127 switches the action policy from the narrow passage straight tracking mode (or the normal tracking mode) to the corner tracking mode. Subsequently, when the action policy is switched to the corner tracking mode, the setting unit 127 resets the tracking distance for corners.

The setting unit 127 also sets the virtual tracking target in a case where the detection unit 128 detects a corner of the passage. More specifically, the setting unit 127 sets the virtual tracking target after resetting the tracking distance for corners. For example, in a case where the corner of the passage detected by the detection unit 128 is a right turn, the setting unit 127 sets the virtual tracking target on the left side with respect to the straight line passing through the center of the straight passage before the corner of the passage, and in a case where the corner of the passage detected by the detection unit 128 is a left turn, the virtual tracking target can be set on the right side with respect to the straight line passing through the center of the straight passage. Moreover, the setting unit 127 sets the virtual tracking target at a position separated inward by a predetermined distance from the end of the passage on the outer side of the corner of the passage. For example, in a case where the corner of the passage detected by the detection unit 128 is a left turn (right turn), the setting unit 127 sets the virtual tracking target at a position that is in an area on the right side (left side) with respect to the center line of the passage and is obtained by subtracting a predetermined distance (for example, a distance obtained by adding a margin to the lateral width of the mobile body) from the position of a wall of the outer occupied grid by back calculation.

In the example illustrated on the right side of FIG. 1, the setting unit 127 sets the virtual tracking target TP2 for corners after resetting the tracking distance for corners. Specifically, since the corner of the passage detected by the detection unit 128 is a left turn, the setting unit 127 sets the virtual tracking target TP2 on the right side with respect to the straight line passing through the center of the straight passage before the corner of the passage. Moreover, the setting unit 127 sets the virtual tracking target TP2 at a position separated inward by a predetermined distance from the end of the passage on the outer side of the corner of the passage.

Subsequently, when the mobile body arrives at the virtual tracking target, the setting unit 127 sets a new virtual tracking target ahead of the virtual tracking target by a predetermined distance. For example, when the mobile body arrives at the virtual tracking target, the setting unit 127 sets the new virtual tracking target with reference to an end of the passage on the outer side of the corner of the passage.

In the example illustrated on the right in FIG. 1, when the mobile body arrives at the virtual tracking target TP2, the setting unit 127 sets the new virtual tracking target TP3 ahead of the virtual tracking target TP2 by a predetermined distance. For example, when the mobile body arrives at the virtual tracking target TP2, the setting unit 127 sets the new virtual tracking target TP3 with reference to an end of the passage on the outer side of the corner of the passage. Note that, when arriving at the new virtual tracking target TP3, the setting unit 127 may switch the action policy from the corner tracking mode to the narrow passage straight tracking mode or the normal tracking mode.

Detection Unit 128

The detection unit 128 detects a corner of a passage around the mobile body. Specifically, the detection unit 128 detects a corner of the passage around the mobile body on the basis of the arrangement of occupied grids in an occupied grid map. More specifically, specifically, the detection unit 128 acquires sensing information by the external field sensor 111 from the sensor unit 110. Subsequently, the detection unit 128 acquires arrangement information regarding the arrangement of the occupied grid on the basis of the sensing information that has been acquired. Subsequently, the estimation unit 125 detects a corner of a passage around the mobile body on the basis of the arrangement information regarding the arrangement of the occupied grid.

The detection unit 128 further detects a corner of a right turn or a corner of a left turn. Specifically, the setting unit 127 detects a corner of a right turn or a corner of a left turn on the basis of the arrangement of an occupied grid matrix of a corner with respect to the extending direction of the straight passage before the corner of the passage. For example, in a case where an occupied grid matrix of a corner is arranged inclined counterclockwise with respect to the extending direction of the straight passage before the corner of the passage, the setting unit 127 detects a corner of a left turn. Meanwhile, in a case where an occupied grid matrix of a corner is arranged inclined clockwise with respect to the extending direction of the straight passage before the corner of the passage, the setting unit 127 detects a corner of a right turn.

In the example illustrated on the right in FIG. 1, the detection unit 128 detects a corner of a left turn since the occupied grid matrix OG3, which is a corner with respect to the extending direction of the straight passage (straight passage sandwiched by the occupied grid matrix OG1 and the occupied grid matrix OG2) before the corner of the passage, is arranged while inclined counterclockwise.

Drive Control Unit 129

The drive control unit 129 controls driving of the mobile body. Specifically, the drive control unit 129 controls the drive unit 150 so that the mobile body travels in accordance with the route plan planned by the planning unit 124. More specifically, the drive unit 150 is controlled so that the mobile body travels in accordance with the route plan planned by the planning unit 124 in accordance with the action policy set by the setting unit 127.

In the example illustrated on the left of FIG. 1, the drive control unit 129 controls the drive unit 150 so that the mobile body device 100 moves in accordance with the route plan planned by the planning unit 124 in accordance with the action policy of the normal tracking mode set by the setting unit 127.

When the setting unit 127 sets the virtual tracking target, the drive control unit 129 controls driving of the mobile body on the basis of the virtual tracking target set by the setting unit 127. Specifically, the drive control unit 129 controls the drive unit 150 so that the mobile body device 100 travels in accordance with the action policy of the narrow passage straight tracking mode set by the setting unit 127. More specifically, the mobile body includes a sensor for detecting a tracking target, and the drive control unit 129 controls the distance between the tracking target and the mobile body so that the tracking target is captured within the detection range of the sensor. For example, the drive control unit 129 controls the distance between the tracking target and the mobile body so that the tracking target is captured within the detection range of the sensor on the basis of the spread angle of the detection range of the sensor and the width of the passage around the mobile body.

In the example illustrated in the center of FIG. 1, when the setting unit 127 sets the virtual tracking target TP1, the drive control unit 129 controls the distance between the tracking target O1 and the mobile body device 100 so that the tracking target O1 is captured within the detection range of the sensor. More specifically, the drive control unit 129 controls the distance between the tracking target O1 and the mobile body device 100 so that the tracking target O1 is captured within a detection range DR1 of the sensor on the basis of the spread angle D1 of the detection range DR1 of the sensor and the width W1 of the passage around the mobile body. For example, the drive control unit 129 controls the distance between the tracking target O1 and the mobile body device 100 so that the spread angle D1 of the detection range DR1 of the sensor coincides with the width W1 of the passage around the mobile body.

In addition, in a case where the detection unit 128 detects a corner of the passage, the drive control unit 129 controls driving of the mobile body so as to reduce the distance between the tracking target and the mobile body as compared with that before the corner of the passage has been detected. Specifically, when the setting unit 127 switches the action policy to the corner tracking mode, the drive control unit 129 controls driving of the mobile body so as to reduce the distance between the tracking target and the mobile body as compared with that before the corner of the passage has been detected.

In the example illustrated on the right in FIG. 1, when the setting unit 127 switches the action policy to the corner tracking mode, the drive control unit 129 controls driving of the drive unit 150 so as to reduce the distance between the tracking target O1 and the mobile body device 100 as compared with that before the corner of the passage has been detected. In addition, when the setting unit 127 sets the virtual tracking target TP2 for corners, the drive control unit 129 plans a traveling route in accordance with the corner tracking mode and controls tracking on the route. Subsequently, when the setting unit 127 sets the new virtual tracking target TP3, the drive control unit 129 plans a traveling route in accordance with the corner tracking mode and controls tracking on the route. Note that, in a case where the setting unit 127 switches the action policy from the corner tracking mode to the narrow passage straight tracking mode or the normal tracking mode when the new virtual tracking target TP3 reached, the drive control unit 129 plans a traveling route in accordance with the narrow passage straight tracking mode or the normal tracking mode and controls the tracking on the route.

Storage Unit 130

The storage unit 130 is implemented by, for example, a semiconductor memory element such as a random access memory (RAM) or a flash memory or a storage device such as a hard disk or an optical disk. For example, the storage unit 130 stores an information processing program according to the embodiment.

In addition, the storage unit 130 stores action policies corresponding to respective modes. For example, the storage unit 130 stores an action policy in the normal tracking mode, an action policy in the narrow passage straight tracking mode that is a tracking mode for narrow passage straight routes in which a virtual tracking target different from the tracking target is tracked, and an action policy in the corner tracking mode that is a tracking mode for corner routes.

In addition, as illustrated in FIG. 4, the storage unit 130 includes the occupied grid map information storing unit 131.

Occupied Grid Map Information Storing Unit 131

The occupied grid map information storing unit 131 stores various types of information regarding the occupied grid map. Specifically, the occupied grid map information storing unit 131 stores information regarding the occupied grid map having been acquired in advance. The occupied grid map information storing unit 131 also stores information regarding the occupied grid map that is updated by the generation unit 123.

Communication Unit 140

The communication unit 140 is implemented by, for example, an NIC or the like. The communication unit 140 is connected to the network N in a wired or wireless manner and, for example, transmits and receives information to and from an external information processing device.

Drive Unit 150

The drive unit 150 has a function of driving a physical configuration in the mobile body device 100. The drive unit 150 has a function of moving the position of the mobile body device 100. The drive unit 150 is, for example, an actuator. Note that the drive unit 150 may have any configuration as long as the mobile body device 100 can implement a desired operation. The drive unit 150 may have any configuration as long as it can allow the position of the mobile body device 100 to move or the like. For example, the drive unit 150 drives a traveling mechanism of the mobile body device 100 in accordance with an instruction from the drive control unit 129, thereby causing the mobile body device 100 to travel and changing the position of the mobile body device 100.

1-4. Procedure of Information Processing According to Embodiment

Figure 5:
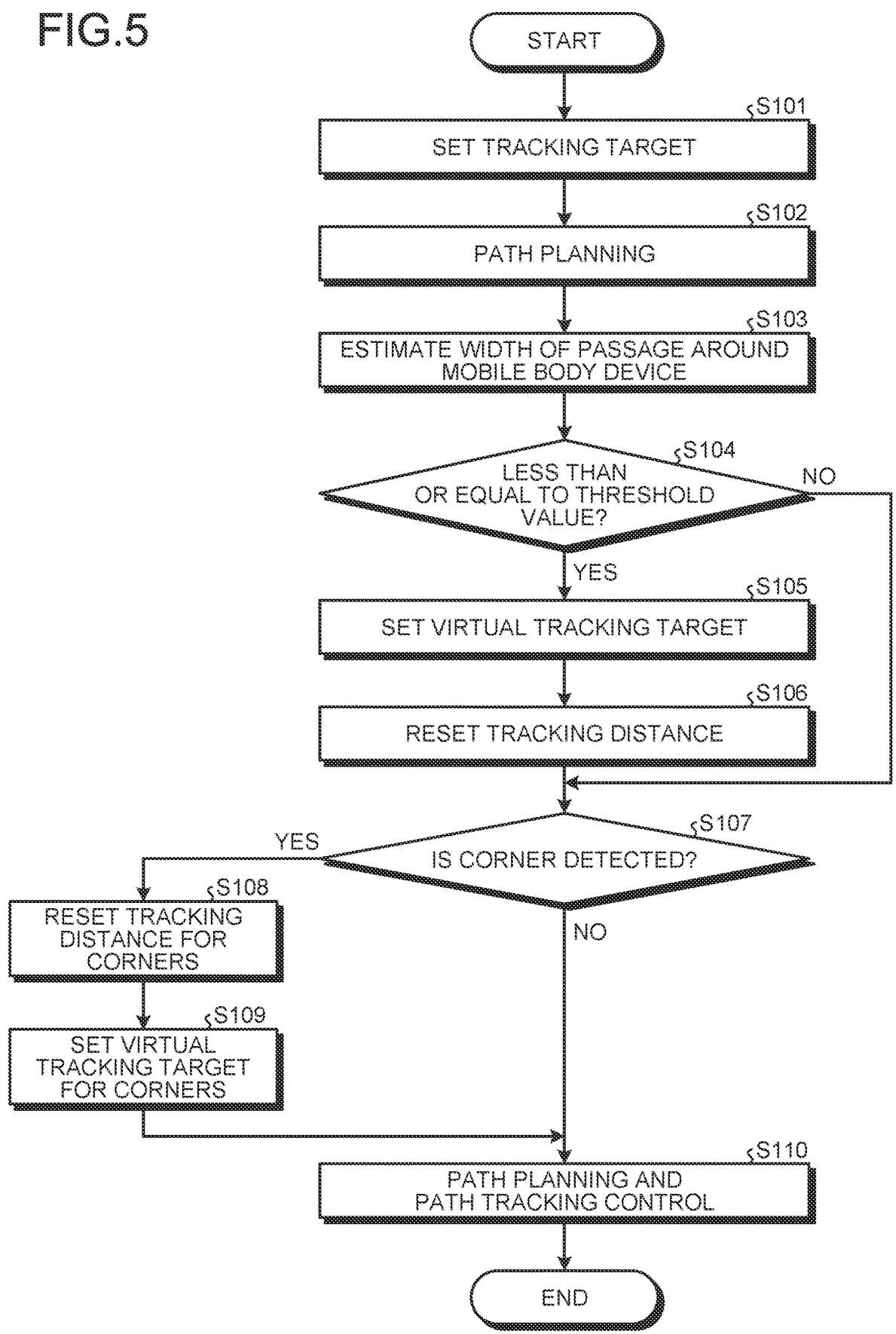
FIG. 5 is a flowchart illustrating a procedure of information processing according to the embodiment of the present disclosure.

Next, the procedure of the information processing according to the embodiment of the present disclosure will be described with reference to FIG. 5. FIG. 5 is a flowchart illustrating the procedure of the information processing according to the embodiment of the present disclosure.

In the example illustrated in FIG. 5, the mobile body device 100 sets a tracking target (step S101). After setting the tracking target, the mobile body device 100 plans a traveling route for traveling while tracking the tracking target (step S102).

After planning the traveling route, the mobile body device 100 estimates the width of the passage around the mobile body (mobile body device 100) (step S103). After estimating the width of the passage, the mobile body device 100 determines whether or not the width of the passage is less than or equal to a predetermined threshold value (step S104). If it is determined that the width of the passage is not less than or equal to the predetermined threshold value (NO in step S104), the mobile body device 100 maintains the action policy in the normal tracking mode for traveling while tracking the tracking target. Subsequently, the mobile body device 100 determines whether or not a corner has been detected (step S107).

If it is determined that the width of the passage is less than or equal to the predetermined threshold value (YES in step S104), the mobile body device 100 switches the action policy from the normal tracking mode to the narrow passage straight tracking mode which is the tracking mode for narrow passage straight routes. After switching the action policy to the narrow passage straight tracking mode, the mobile body device 100 sets a virtual tracking target (step S105). Subsequently, after setting the virtual tracking target, the mobile body device 100 resets the distance (tracking distance) to the tracking target (step S106). Then, after resetting the tracking distance, the mobile body device 100 determines whether or not a corner has been detected (step S107).

If it is determined that no corner has been detected (NO in step S107), the mobile body device 100 maintains the narrow passage straight tracking mode or switches the action policy from the narrow passage straight tracking mode to the normal tracking mode. The mobile body device 100 plans a traveling route in accordance with the narrow passage straight tracking mode or the normal tracking mode and controls tracking on the route (step S110).

On the other hand, if it is determined that a corner has been detected (YES in step S107), the mobile body device 100 switches the action policy from the narrow passage straight tracking mode or the normal tracking mode to the corner tracking mode which is a tracking mode for corner routes. After the action policy is switched to the corner tracking mode, the mobile body device 100 resets the tracking distance for corners (step S108). Subsequently, after resetting the tracking distance for corners, the mobile body device 100 sets a virtual tracking target for corners (step S109). Subsequently, after setting the virtual tracking target for corners, the mobile body device 100 plans a traveling route in accordance with the corner tracking mode and controls the tracking on the route (step S110).

2. Other Embodiments

2-1. Application Example Under Other Conditions

In the above-described embodiment, examples in which the mobile body device 100 sets a virtual tracking target in a narrow passage or at a corner have been described; however, the application example is not limited thereto. For example, in a case of tracking a person who is waiting for an elevator, the setting unit 127 may set the virtual tracking target at the center of the door of the elevator.

As described above, without limiting to the elevators, the setting unit 127 may set the virtual tracking target at the center of the entrance or the exit in a situation where the autonomous mobile robot tracks a tracking target who enters the entrance (ENTRY point) or exits the exit (EXT point). As a result, the mobile body device 100 can prevent the autonomous mobile robot from performing an unnatural behavior to track the tracking target every time the tracking target in a cue at the entrance or the exit moves.

3. Application Example to Mobile Body

The technology according to the present disclosure (present technology) can be applied to various products. For example, the technology according to the present disclosure may be implemented as a device to be mounted on a mobile body of any type such as automobiles, electric vehicles, hybrid electric vehicles, motorcycles, bicycles, personal mobilities, airplanes, drones, ships, and robots.

Figure 6:
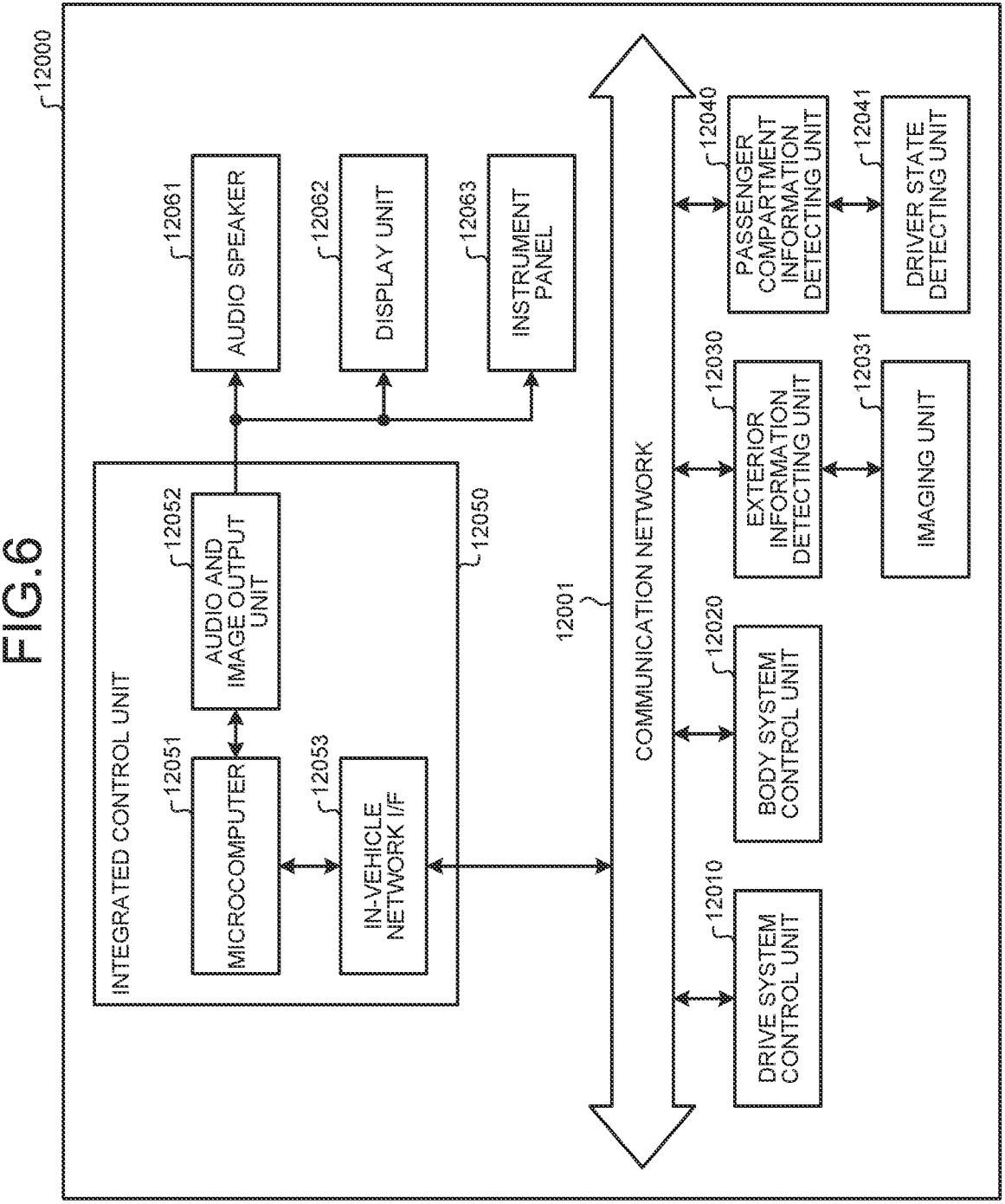
FIG. 6 is a block diagram illustrating an example of a schematic configuration of a vehicle control system.

FIG. 6 is a block diagram illustrating a schematic configuration example of a vehicle control system which is an example of a mobile body control system to which the technology according to the present disclosure can be applied.

A vehicle control system 12000 includes a plurality of electronic control units connected via a communication network 12001. In the example illustrated in FIG. 6, the vehicle control system 12000 includes a drive system control unit 12010, a body system control unit 12020, an exterior information detecting unit 12030, a passenger compartment information detecting unit 12040, and an integrated control unit 12050. Furthermore, as a functional configuration of the integrated control unit 12050, a microcomputer 12051, an audio and image output unit 12052, and an in-vehicle network interface (I/F) 12053 are illustrated.

The drive system control unit 12010 controls the operation of devices related to the drive system of the vehicle in accordance with various programs. For example, the drive system control unit 12010 functions as a control device of a driving force generation device for generating a driving force of the vehicle such as an internal combustion engine or a driving motor, a driving force transmission mechanism for transmitting the driving force to wheels, a steering mechanism for adjusting a steering angle of the vehicle, a braking device for generating a braking force of the vehicle, and the like.

The body system control unit 12020 controls the operation of various devices mounted on the vehicle body in accordance with various programs. For example, the body system control unit 12020 functions as a control device of a keyless entry system, a smart key system, a power window device, or various lamps such as a head lamp, a rear lamp, a brake lamp, a blinker, or a fog lamp. In this case, radio waves transmitted from a portable device that substitutes for a key or signals of various switches can be input to the body system control unit 12020. The body system control unit 12020 accepts input of these radio waves or signals and controls a door lock device, a power window device, lamps, and the like of the vehicle.

The exterior information detecting unit 12030 detects information exterior to the vehicle on which the vehicle control system 12000 is mounted. For example, an imaging unit 12031 is connected to the exterior information detecting unit 12030. The exterior information detecting unit 12030 causes the imaging unit 12031 to capture an image of the outside of the vehicle and receives the image that has been captured. The exterior information detecting unit 12030 may perform object detection processing or distance detection processing of a person, a vehicle, an obstacle, a sign, characters on a road surface, or the like on the basis of the image received.

The imaging unit 12031 is an optical sensor that receives light and outputs an electric signal corresponding to the amount of received light. The imaging unit 12031 can output the electric signal as an image or can output the electric signal as ranging information. Furthermore, the light received by the imaging unit 12031 may be visible light or invisible light such as infrared rays.

The passenger compartment information detecting unit 12040 detects information inside the passenger compartment. For example, a driver state detecting unit 12041 that detects the state of a driver is connected to the passenger compartment information detecting unit 12040. The driver state detecting unit 12041 includes, for example, a camera that images the driver, and the passenger compartment information detecting unit 12040 may calculate the degree of fatigue or the degree of attention of the driver or may determine whether or not the driver is dozing off on the basis of detection information input from the driver state detecting unit 12041.

The microcomputer 12051 can calculate a control target value of the driving force generation device, the steering mechanism, or the braking device on the basis of information inside and outside the vehicle acquired by the exterior information detecting unit 12030 or the passenger compartment information detecting unit 12040 and output a control command to the drive system control unit 12010. For example, the microcomputer 12051 can perform cooperative control for the purpose of implementing functions of an advanced driver assistance system (ADAS) including collision avoidance or impact mitigation of the vehicle, tracking traveling based on an inter-vehicle distance, constant speed traveling, collision warning of the vehicle, lane deviation warning of the vehicle, or the like.

Furthermore, the microcomputer 12051 can perform cooperative control for the purpose of autonomous driving or the like in which the vehicle autonomously travels without depending on the operation of a driver by controlling the driving force generation device, the steering mechanism, the braking device, or the like on the basis of information around the vehicle acquired by the exterior information detecting unit 12030 or the passenger compartment information detecting unit 12040.

The microcomputer 12051 can also output a control command to the body system control unit 12020 on the basis of exterior information acquired by the exterior information detecting unit 12030. For example, the microcomputer 12051 can perform cooperative control for the purpose of preventing glare, such as switching from a high beam to a low beam, by controlling the head lamp depending on the position of a preceding vehicle or an oncoming vehicle detected by the exterior information detecting unit 12030.

The audio and image output unit 12052 transmits an output signal of at least one of sound or an image to an output device capable of visually or audibly notifying a passenger of the vehicle or the outside of the vehicle of information. In the example of FIG. 6, an audio speaker 12061, a display unit 12062, and an instrument panel 12063 are illustrated as examples of the output device. The display unit 12062 may include, for example, at least one of an on-board display and a head-up display.

Figure 7:
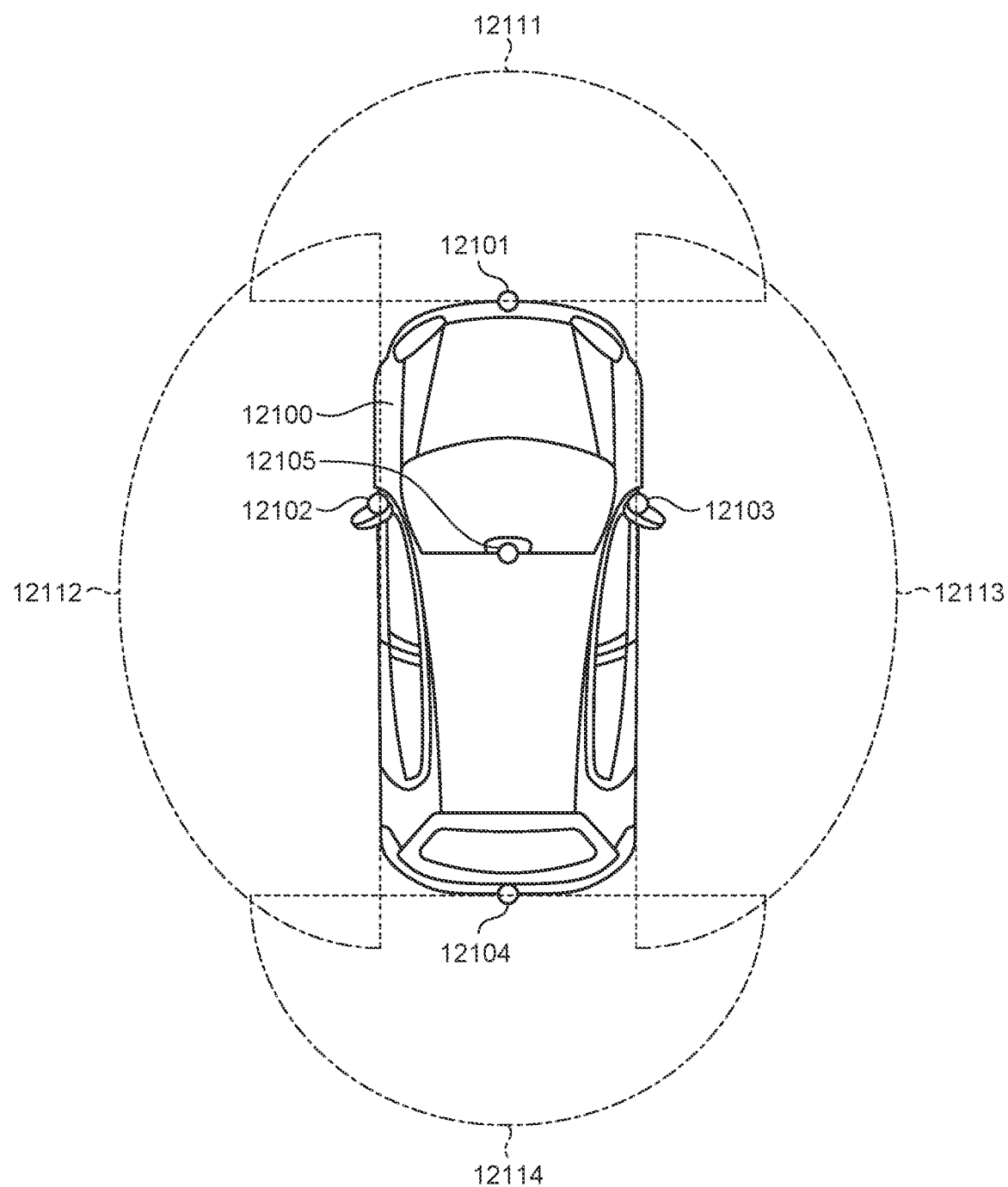
FIG. 7 is an explanatory diagram illustrating an example of installation positions of an exterior information detecting unit and imaging units.

FIG. 7 is a diagram illustrating an example of installation positions of the imaging unit 12031.

In FIG. 7, as the imaging unit 12031, imaging units 12101, 12102, 12103, 12104, and 12105 are included.

The imaging units 12101, 12102, 12103, 12104, and 12105 are provided, for example, at positions such as the front nose, the side mirrors, the rear bumper, the rear door, and an upper portion of the windshield in the passenger compartment of a vehicle 12100. The imaging unit 12101 provided at the front nose and the imaging unit 12105 provided at the upper portion of the windshield in the passenger compartment mainly acquire images ahead of the vehicle 12100. The imaging units 12102 and 12103 provided at the side mirrors mainly acquire images beside the vehicle 12100. The imaging unit 12104 provided at the rear bumper or the rear door mainly acquires images behind the vehicle 12100. The imaging unit 12105 provided at the upper portion of the windshield in the passenger compartment is used mainly for detection of preceding vehicles, pedestrians, obstacles, traffic lights, traffic signs, lanes, or the like.

Note that an example of imaging ranges of the imaging units 12101 to 12104 is illustrated in FIG. 7. An imaging range 12111 indicates an imaging range of the imaging unit 12101 provided at the front nose, imaging ranges 12112 and 12113 indicate imaging ranges of the imaging units 12102 and 12103 provided at the side mirrors, respectively, and an imaging range 12114 indicates an imaging range of the imaging unit 12104 provided at the rear bumper or the rear door. For example, by superimposing image data captured by the imaging units 12101 to 12104, an overhead image of the vehicle 12100 as viewed from above is obtained.

At least one of the imaging units 12101 to 12104 may have a function of acquiring distance information. For example, at least one of the imaging units 12101 to 12104 may be a stereo camera including a plurality of imaging elements or may be an imaging element having pixels for phase difference detection.

For example, the microcomputer 12051 can extract, as a preceding vehicle, in particular the closest three-dimensional object on a traveling path of the vehicle 12100, which is traveling at a specified speed (for example, 0 km/h or faster) in substantially the same direction as the vehicle 12100 by obtaining a distance to each three-dimensional object in the imaging ranges 12111 to 12114 and a temporal change of the distance (relative speed with respect to the vehicle 12100) on the basis of distance information obtained from the imaging units 12101 to 12104. Furthermore, the microcomputer 12051 can set in advance an inter-vehicle distance to be ensured from the preceding vehicle and perform automatic brake control (including tracking stop control), automatic acceleration control (including tracking start control), and the like. As described above, it is possible to perform cooperative control for the purpose of autonomous driving or the like in which the vehicle autonomously travels without depending on the operation of the driver.

For example, on the basis of the distance information obtained from the imaging units 12101 to 12104, the microcomputer 12051 can classify three-dimensional object data related to three-dimensional objects into two-wheeled vehicles, ordinary vehicles, large vehicles, pedestrians, and other three-dimensional objects such as utility poles and extract from the three-dimensional object data for use in automatic avoidance of obstacles. For example, the microcomputer 12051 distinguishes obstacles around the vehicle 12100 between obstacles that the driver of the vehicle 12100 can be visually recognize and obstacles that are difficult to visually recognize. Then, the microcomputer 12051 determines a collision risk indicating the degree of risk of collision with each obstacle, and in a situation where the collision risk is greater than or equal to a set value and there is a possibility of collision, the microcomputer 12051 can perform driving assistance for collision avoidance by outputting an alarm to the driver via the audio speaker 12061 or the display unit 12062 or performing forced deceleration or avoidance steering via the drive system control unit 12010.

At least one of the imaging units 12101 to 12104 may be an infrared camera that detects infrared rays. For example, the microcomputer 12051 can recognize a pedestrian by determining whether or not a pedestrian is included in images captured by the imaging units 12101 to 12104. Such recognition of a pedestrian is performed by, for example, a procedure of extracting feature points in images captured by the imaging units 12101 to 12104 as infrared cameras and a procedure of performing pattern matching processing on a series of feature points indicating the contour of an object and determining whether or not the object is a pedestrian. When the microcomputer 12051 determines that a pedestrian is included in the images captured by the imaging units 12101 to 12104 and recognizes the pedestrian, the audio and image output unit 12052 controls the display unit 12062 to superimpose and display a square contour line for emphasis on the pedestrian who has been recognized. Furthermore, the audio and image output unit 12052 may control the display unit 12062 so as to display an icon or the like indicating a pedestrian at a desired position.

An example of the vehicle control system to which the technology according to the present disclosure can be applied has been described above. The technology according to the present disclosure can be applied to the microcomputer 12051 among the above-described components. Specifically, by applying the technology according to the present disclosure to the microcomputer 12051, it becomes possible to cause the autonomous mobile robot to track the tracking target in a more natural behavior.

4. Effects of Present Disclosure

As described above, an information processing device (mobile body device 100 in the embodiment) according to the present disclosure includes a reception unit (reception unit 121 in the embodiment), a setting unit (setting unit 127 in the embodiment), and a drive control unit (the drive control unit 129 in the embodiment). The reception unit accepts designation of a tracking target. The setting unit sets a virtual tracking target different from the tracking target. The drive control unit controls driving of the mobile body on the basis of the virtual tracking target.

As a result, the information processing device can control driving so that the autonomous mobile robot travels straight toward the virtual tracking target without being affected by the traveling of the tracking target even when the tracking target significantly moves to the left or right, and thus it is possible to reduce the risk that the tracking target is located outside the detection range of a detection sensor. Therefore, the information processing device can cause the autonomous mobile robot to track the tracking target in a more natural behavior while keeping the tracking target within the detection range of the detection sensor.

In addition, even in a situation in which the operation of avoiding an obstacle by the autonomous mobile robot tends to conflict with the operation of tracking the tracking target, such as a situation where the autonomous mobile robot tracks the tracking target on a narrow passage, the information processing device can allow the autonomous mobile robot to focus on the operation of tracking the virtual tracking target. Therefore, the autonomous mobile robot can be prevented from meandering due to the conflict between the avoiding operation and the tracking operation. Therefore, the information processing device can cause the autonomous mobile robot to track the tracking target in a more natural behavior.

In addition, the information processing device can improve the value, performance, and safety at the time of the tracking operation by the autonomous mobile robot while using existing target tracking policies (or algorithms), route planning algorithms, and the structure of the occupied grid map without modification. Specifically, the information processing device can use the existing asset called route search algorithms, which have been actively developed in recent years, at their maximum. In addition, since the information processing device does not require modification of route search algorithms that affect the load of a calculator, there is less influence on the calculation resources. In addition, the information processing device does not need to add sensors, calculation resources, hardware, or the like to an existing autonomous mobile robot and can travel by itself. In addition, the information processing device makes it possible to easily select an action plan policy at the time of tracking in accordance with the usability of a user or a use case in the framework of the present invention, such as applying only the tracking policy for corners.

Specifically, the setting unit sets a virtual tracking target in a case where the width of a passage around the mobile body is less than or equal to a predetermined threshold value.

As a result, even in a narrow passage where there are many obstacles and the behavior of avoiding an obstacle and the behavior of tracking the tracking target by the autonomous mobile robot are likely to conflict with each other, the information processing device can prevent the behavior of avoiding the obstacle and the behavior of tracking the tracking target by the autonomous mobile robot from conflicting with each other. Therefore, the information processing device makes it possible to cause the autonomous mobile robot to track the tracking target in a more natural behavior even in a narrow passage.

Furthermore, the information processing device according to the present disclosure further includes an estimation unit (estimation unit 125 in the embodiment) and a determination unit (determination unit 126 in the embodiment). The estimation unit estimates the width of a passage around the mobile body. The determination unit determines whether the width of the passage estimated by the estimation unit is less than or equal to a predetermined threshold value. In a case where the determination unit determines that the width of the passage is less than or equal to the predetermined threshold value, the setting unit sets the virtual tracking target. In addition, the estimation unit estimates the width of the passage around the mobile body on the basis of the arrangement of occupied grids in an occupied grid map.

As a result, the information processing device makes it possible to cause the autonomous mobile robot to track the tracking target in a more natural behavior both in a case where it is known on a map in advance that the passage width is narrow and in a case where the autonomous mobile robot sequentially observes the shape of occupied grids without prior information.

In addition, the setting unit sets the virtual tracking target on the center line of the passage.

As a result, the information processing device can cause the autonomous mobile robot to track the tracking target in a more natural behavior without colliding with a wall of the passage even in a case where it is a narrow passage.

The mobile body also includes a sensor for detecting a tracking target, and the drive control unit controls the distance between the tracking target and the mobile body so that the tracking target is captured within the detection range of the sensor.

As a result, the information processing device can cause the autonomous mobile robot to track the tracking target in a more natural behavior while continuing to capture the tracking target in the detection range of the sensor.

In addition, the drive control unit controls the distance between the tracking target and the mobile body so that the tracking target is captured within the detection range of the sensor on the basis of the spread angle of the detection range of the sensor and the width of the passage around the mobile body.

As a result, the information processing device can prevent the tracking target from entering a blind spot of the sensor and deviating from the detection range, and thus it is made possible to cause the autonomous mobile robot to track the tracking target in a more natural behavior.

Furthermore, the information processing device according to the present disclosure further includes a detection unit (detection unit 128 in the embodiment). The detection unit detects a corner of a passage around the mobile body. The setting unit sets a virtual tracking target in a case where the detection unit detects a corner of the passage. Moreover, the detection unit detects a corner of the passage around the mobile body on the basis of the arrangement of occupied grids in an occupied grid map.

As a result, the information processing device makes it possible to cause the autonomous mobile robot to track the tracking target in a more natural behavior without losing sight of the tracking target even in a tracking situation of a corner where the autonomous mobile robot easily loses sight of the tracking target.

In addition, in a case where the corner of the passage detected by the detection unit is a right turn, the setting unit sets the virtual tracking target on the left side with respect to the straight line passing through the center of the straight passage before the corner of the passage, and in a case where the corner of the passage detected by the detection unit is a left turn, the setting unit sets the virtual tracking target on the right side with respect to the straight line passing through the center of the straight passage.

As a result, the information processing device can reduce the risk that the autonomous mobile robot loses sight of the tracking target by an occupied grid on the inner side of the corner, and thus the autonomous mobile robot can be caused to track the tracking target in a more natural behavior.

Moreover, the setting unit sets the virtual tracking target at a position separated inward by a predetermined distance from an end of the passage on the outer side of the corner of the passage.

As a result, the information processing device can prevent the autonomous mobile robot from hitting the outer wall of the corner of the passage, and thus the autonomous mobile robot can be caused to track the tracking target in a more natural behavior.

Furthermore, in a case where the detection unit detects a corner of the passage, the drive control unit controls driving of the mobile body so as to reduce the distance between the tracking target and the mobile body as compared with that before the corner of the passage has been detected.

As a result, the information processing device can track the tracking target without losing sight of the tracking target nor giving a sense of anxiety or fear to the tracking target even in a tracking situation at a corner where the autonomous mobile robot easily loses sight of the tracking target.

When the mobile body arrives at the virtual tracking target, the setting unit sets a new virtual tracking target ahead of the virtual tracking target by a predetermined distance. Furthermore, the setting unit sets the new virtual tracking target with reference to the end of the passage on the outer side of the corner of the passage when the mobile body arrives at the virtual tracking target.

As a result, the information processing device can cause the autonomous mobile robot to track the tracking target in a more natural behavior even after the tracking target has turned the corner.

5. Hardware Configuration

Figure 8:
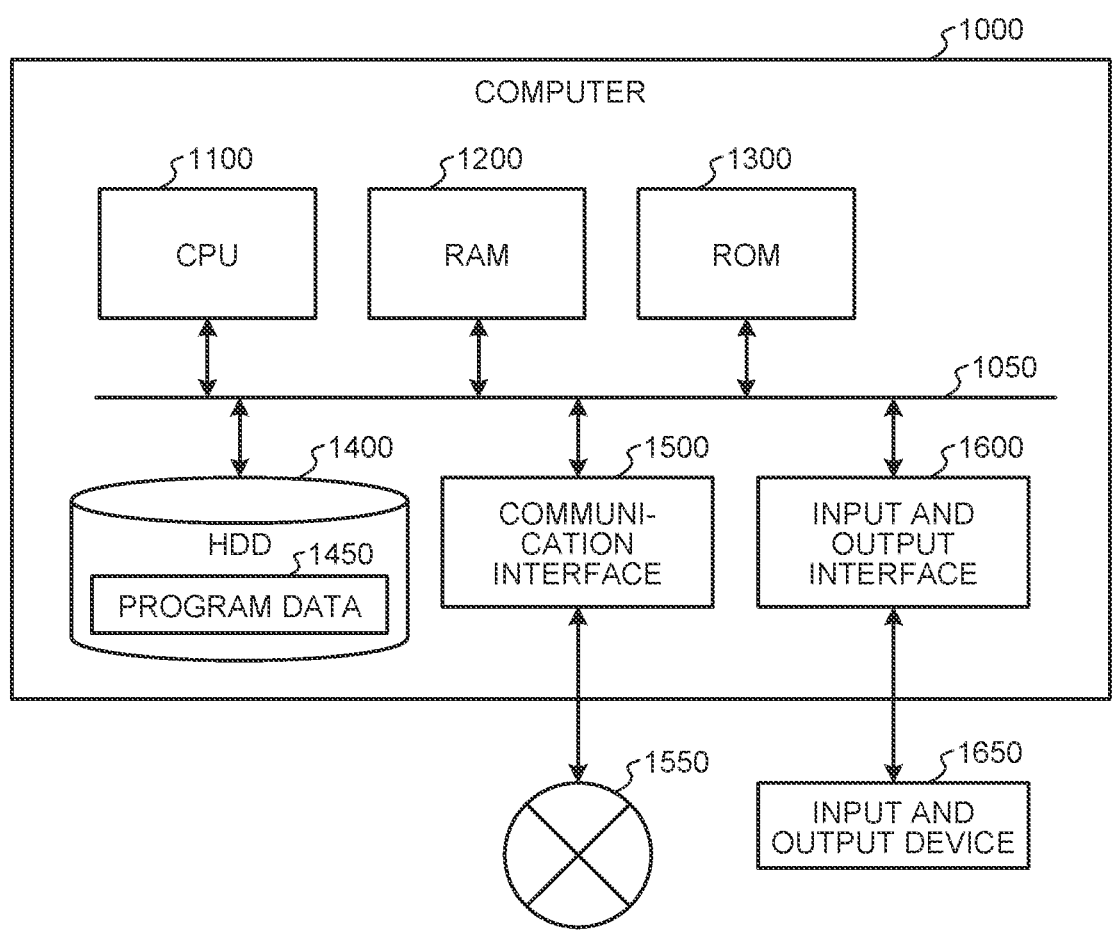
FIG. 8 is a hardware configuration diagram illustrating an example of a computer that implements functions of an information processing device.

The information devices such as the mobile body device 100 according to the embodiment or the modification described above are implemented by, for example, a computer 1000 having a configuration as illustrated in FIG. 8. FIG. 8 is a hardware configuration diagram illustrating an example of the computer 1000 that implements the functions of the information processing device such as the mobile body device 100. Hereinafter, the mobile body device 100 according to the embodiment will be described as an example. The computer 1000 includes a CPU 1100, a RAM 1200, a read only memory (ROM) 1300, a hard disk drive (HDD) 1400, a communication interface 1500, and an input and output interface 1600. The units of the computer 1000 are connected by a bus 1050.

The CPU 1100 operates in accordance with a program stored in the ROM 1300 or the HDD 1400 and controls each of the units. For example, the CPU 1100 loads a program stored in the ROM 1300 or the HDD 1400 in the RAM 1200 and executes processes corresponding to various programs.

The ROM 1300 stores a boot program such as a basic input output system (BIOS) executed by the CPU 1100 when the computer 1000 is activated, a program dependent on the hardware of the computer 1000, and the like.

The HDD 1400 is a computer-readable recording medium that non-transiently records a program to be executed by the CPU 1100, data used by such a program, and the like. Specifically, the HDD 1400 is a recording medium that records the information processing program according to the present disclosure, which is an example of program data 1450.

The communication interface 1500 is an interface for the computer 1000 to be connected with an external network 1550 (for example, the Internet). For example, the CPU 1100 receives data from another device or transmits data generated by the CPU 1100 to another device via the communication interface 1500.

The input and output interface 1600 is an interface for connecting an input and output device 1650 and the computer 1000. For example, the CPU 1100 receives data from an input device such as a keyboard and a mouse via the input and output interface 1600. The CPU 1100 also transmits data to an output device such as a display, a speaker, or a printer via the input and output interface 1600. Furthermore, the input and output interface 1600 may function as a media interface that reads a program or the like recorded in a predetermined recording medium (medium). A medium refers to, for example, an optical recording medium such as a digital versatile disc (DVD) or a phase change rewritable disk (PD), a magneto-optical recording medium such as a magneto-optical disk (MO), a tape medium, a magnetic recording medium, a semiconductor memory, or the like.

For example, in a case where the computer 1000 functions as the mobile body device 100 according to the embodiment, the CPU 1100 of the computer 1000 implements the functions of the control unit 120 or other units by executing the information processing program loaded on the RAM 1200. The HDD 1400 also stores the information processing program according to the present disclosure or data in the storage unit 130. Note that although the CPU 1100 reads the program data 1450 from the HDD 1400 and executes the program data 1450, as another example, these programs may be acquired from another device via the external network 1550.

Note that the present technology can also have the following configurations.

(1)

An information processing device comprising:
  a reception unit that accepts designation of a tracking target;
  a setting unit that sets a virtual tracking target different from the tracking target; and
  a drive control unit that controls driving of a mobile body on a basis of the virtual tracking target.

(2)

The information processing device according to (1),
  wherein the setting unit sets the virtual tracking target in a case where a width of a passage around the mobile body is less than or equal to a predetermined threshold value.

(3)

The information processing device according to (2), further comprising:
  an estimation unit that estimates the width of the passage around the mobile body; and
  a determination unit that determines whether or not the width of the passage estimated by the estimation unit is less than or equal to the predetermined threshold value,
  wherein the setting unit sets the virtual tracking target in a case where the determination unit determines that the width of the passage is less than or equal to the predetermined threshold value.

(4)
The information processing device according to (3), wherein the estimation unit estimates the width of the passage around the mobile body on a basis of an arrangement of an occupied grid in an occupied grid map.

(5)
The information processing device according to any of (2) to (4), wherein the setting unit sets the virtual tracking target on a center line of the passage.

(6)
The information processing device according to any of (1) to (5), wherein the mobile body comprises a sensor for detecting the tracking target, and the drive control unit controls a distance between the tracking target and the mobile body so that the tracking target is captured within a detection range of the sensor.

(7)
The information processing device according to (6), wherein the drive control unit controls the distance between the tracking target and the mobile body so that the tracking target is captured within the detection range of the sensor on a basis of a spread angle of the detection range of the sensor and the width of the passage around the mobile body.

(8)
The information processing device according to any of (1) to (7), further comprising a detection unit that detects a corner of the passage around the mobile body, wherein the setting unit sets the virtual tracking target in a case where the detection unit detects a corner of the passage.

(9)
The information processing device according to (8), wherein the detection unit detects a corner of the passage around the mobile body on a basis of an arrangement of an occupied grid in an occupied grid map.

(10)
The information processing device according to (8) or (9), wherein, in a case where the corner of the passage detected by the detection unit is a right turn, the setting unit sets the virtual tracking target on a left side with respect to a straight line passing through a center of the passage that is straight before the corner of the passage, and in a case where the corner of the passage detected by the detection unit is a left turn, the setting unit sets the virtual tracking target on a right side with respect to the straight line passing through the center of the passage that is straight.

(11)
The information processing device according to (10), wherein the setting unit sets the virtual tracking target at a position separated inward by a predetermined distance from an end of the passage on an outer side of the corner of the passage.

(12)
The information processing device according to any of (8) to (11), wherein, in a case where the detection unit detects a corner of the passage, the drive control unit controls driving of the mobile body so as to reduce the distance between the tracking target and the mobile body as compared with that before the corner of the passage has been detected.

(13)
The information processing device according to any of (8) to (12), wherein, when the mobile body arrives at the virtual tracking target, the setting unit sets a new virtual tracking target ahead of the virtual tracking target by a predetermined distance.

(14)
The information processing device according to any of (8) to (13), wherein, when the mobile body arrives at the virtual tracking target, the setting unit sets a new virtual tracking target with reference to an end of the passage on an outer side of the corner of the passage.

(15)
An information processing method comprising:
accepting designation of a tracking target;
setting a virtual tracking target different from the tracking target; and
controlling driving of a mobile body on a basis of the virtual tracking target.

(16)
An information processing program for causing a computer to execute:
a reception procedure of accepting designation of a tracking target;
a setting procedure of setting a virtual tracking target different from the tracking target; and
a drive control procedure of controlling driving of a mobile body on a basis of the virtual tracking target.

REFERENCE SIGNS LIST

1 INFORMATION PROCESSING SYSTEM
11 LiDAR
12 Sonar
13 CAMERA
21 IMU
22 ENCODER
100 MOBILE BODY DEVICE
110 SENSOR UNIT
111 EXTERNAL FIELD SENSOR
112 INTERNAL FIELD SENSOR
120 CONTROL UNIT
121 RECEPTION UNIT
122 ACQUISITION UNIT
123 GENERATION UNIT
124 PLANNING UNIT
125 ESTIMATION UNIT
126 DETERMINATION UNIT
127 SETTING UNIT
128 DETECTION UNIT
129 DRIVE CONTROL UNIT
130 STORAGE UNIT
131 OCCUPIED GRID MAP INFORMATION STORING UNIT
140 COMMUNICATION UNIT
150 DRIVE UNIT
200 USER INTERFACE

The invention claimed is:
1. An information processing device, comprising:
a reception unit configured to accept designation of a tracking target;
a setting unit configured to set a virtual tracking target different from the tracking target based on a determination that a width of a passage around a mobile body is less than or equal to a specific threshold value; and a drive control unit configured to control driving of the mobile body based on the virtual tracking target.

2. The information processing device according to claim 1, further comprising:
an estimation unit configured to estimate the width of the passage around the mobile body; and
a determination unit configured to determine that the estimated width of the passage is less than or equal to the specific threshold value, wherein the setting unit is further configured to set the virtual tracking target based on a determination that the width of the passage is less than or equal to the specific threshold value.

3. The information processing device according to claim 2, wherein the estimation unit is further configured to estimate the width of the passage around the mobile body based on an arrangement of an occupied grid in an occupied grid map.

4. The information processing device according to claim 1, wherein the setting unit is further configured to set the virtual tracking target on a center line of the passage.

5. The information processing device according to claim 1, wherein the mobile body comprises a sensor for detecting the tracking target, and
the drive control unit is further configured to control a distance between the tracking target and the mobile body to capture the tracking target within a detection range of the sensor.

6. The information processing device according to claim 5, wherein the drive control unit is further configured to control the distance between the tracking target and the mobile body to capture the tracking target within the detection range of the sensor based on a spread angle of the detection range of the sensor and the width of the passage around the mobile body.

7. The information processing device according to claim 1, further comprising
a detection unit configured to detect a corner of the passage around the mobile body; and
the setting unit is further configured to set the virtual tracking target based on a determination that the detection unit is configured to detect a corner of the passage.

8. The information processing device according to claim 7, wherein the detection unit is further configured to detect a corner of the passage around the mobile body based on an arrangement of an occupied grid in an occupied grid map.

9. The information processing device according to claim 7, wherein,
based on a determination that the corner of the passage detected by the detection unit is a right turn, the setting unit is further configured to set the virtual tracking target on a left side with respect to a straight line passing through a center of the passage that is straight before the corner of the passage, and
based on a determination that the corner of the passage detected by the detection unit is a left turn, the setting unit is further configured to set the virtual tracking target on a right side with respect to the straight line passing through the center of the passage that is straight.

10. The information processing device according to claim 9, wherein the setting unit is further configured to set the virtual tracking target at a position separated inward by a specific distance from an end of the passage on an outer side of the corner of the passage.

11. The information processing device according to claim 7, wherein, based on a determination that the detection unit is further configured to detect a corner of the passage, the drive control unit is further configured to control driving of the mobile body to reduce a distance between the tracking target and the mobile body as compared with that before the corner of the passage has been detected.

12. The information processing device according to claim 7, wherein, based on a determination that the mobile body arrives at the virtual tracking target, the setting unit is further configured to set a new virtual tracking target ahead of the virtual tracking target by a specific distance.

13. The information processing device according to claim 7, wherein, based on a determination that the mobile body arrives at the virtual tracking target, the setting unit is further configured to set a new virtual tracking target with reference to an end of the passage on an outer side of the corner of the passage.

14. An information processing method, comprising:
accepting designation of a tracking target;
setting a virtual tracking target different from the tracking target based on a determination that a width of a passage around a mobile body is less than or equal to a specific threshold value; and
controlling driving of the mobile body based on the virtual tracking target.

15. A non-transitory computer-readable medium having stored thereon, computer-executable instructions which, when executed by a computer, cause the computer to execute operations, the operations comprising:
accepting designation of a tracking target;
setting a virtual tracking target different from the tracking target based on a determination that a width of a passage around a mobile body is less than or equal to a specific threshold value; and
controlling driving of the mobile body based on the virtual tracking target.

* * * * *